(12) United States Patent
Brenner et al.

(10) Patent No.: US 12,417,367 B2
(45) Date of Patent: Sep. 16, 2025

(54) PRODUCT INFORMATION SYSTEMS AND METHODS

(71) Applicant: iSee Store Innovations, L.L.C., St. Louis, MO (US)

(72) Inventors: Steven Allen Brenner, St. Louis, MO (US); Blake Anderson, St. Louis, MO (US); Matt McCoy, St. Louis, MO (US); Vikas Alluri, Maryland Heights, MO (US)

(73) Assignee: iSEE STORE INNOVATIONS, LLC, St. Louis, MO (US)

( * ) Notice: Subject to any disclaimer, the term of this patent is extended or adjusted under 35 U.S.C. 154(b) by 170 days.

(21) Appl. No.: 18/347,807

(22) Filed: Jul. 6, 2023

(65) Prior Publication Data
US 2024/0020505 A1    Jan. 18, 2024

Related U.S. Application Data

(60) Provisional application No. 63/389,962, filed on Jul. 18, 2022, provisional application No. 63/410,307, filed on Sep. 27, 2022, provisional application No. 63/420,786, filed on Oct. 31, 2022, provisional application No. 63/387,103, filed on Dec. 13, 2022.

(51) Int. Cl.
  *G06K 19/07* (2006.01)
  *G06K 19/08* (2006.01)
  *G06Q 30/06* (2023.01)
(52) U.S. Cl.
  CPC ....... *G06K 19/0727* (2013.01); *G06K 19/083* (2013.01); *G06Q 30/06* (2013.01)

(58) Field of Classification Search
  CPC .............. G06K 19/0723; G06K 19/07703
  USPC ........................................... 235/492
  See application file for complete search history.

(56) References Cited

U.S. PATENT DOCUMENTS

| | | | |
|---|---|---|---|
| 10,104,986 B2 | 10/2018 | Schaefer | |
| 10,393,168 B2 | 8/2019 | Schaefer | |
| 10,885,418 B2 * | 1/2021 | Nyalamadugu | G06K 19/07715 |
| 2006/0123041 A1 * | 6/2006 | Sandrini | H04M 1/72412 |
| | | | 707/999.102 |
| 2008/0113658 A1 * | 5/2008 | Bloebaum | G06Q 30/02 |
| | | | 455/418 |
| 2008/0238610 A1 * | 10/2008 | Rosenberg | G06Q 30/0601 |
| | | | 705/26.1 |
| 2009/0058647 A1 * | 3/2009 | Dennard | G06Q 30/06 |
| | | | 340/572.1 |
| 2009/0293815 A1 * | 12/2009 | Coiro, Sr. | A01K 1/031 |
| | | | 119/417 |
| 2010/0125492 A1 * | 5/2010 | Lin | G06Q 20/3274 |
| | | | 705/14.5 |
| 2011/0102144 A1 * | 5/2011 | Okina | G06Q 30/02 |
| | | | 340/5.91 |
| 2013/0059534 A1 * | 3/2013 | Sobalvarro | H04W 4/50 |
| | | | 455/41.1 |
| 2013/0267174 A1 * | 10/2013 | Moon | H04L 67/5651 |
| | | | 455/41.1 |

(Continued)

*Primary Examiner* — Paultep Savusdiphol
(74) *Attorney, Agent, or Firm* — Joseph M. Butscher; The Small Patent Law Group, LLC

(57) ABSTRACT

A product information system and method include a housing, and a communication device coupled to the housing. The communication device is configured to provide information regarding one or more products in response to being engaged by a device of an individual.

30 Claims, 24 Drawing Sheets

(56) References Cited

U.S. PATENT DOCUMENTS

| | | | |
|---|---|---|---|
| 2014/0113549 A1* | 4/2014 | Beg | H04W 4/12 |
| | | | 455/41.1 |
| 2014/0129307 A1* | 5/2014 | Walker | G06Q 30/0222 |
| | | | 705/14.23 |
| 2014/0324638 A1* | 10/2014 | Khalid | G06Q 30/0238 |
| | | | 705/27.1 |
| 2015/0073946 A1* | 3/2015 | Werner | G06Q 30/0643 |
| | | | 705/27.2 |
| 2015/0112790 A1* | 4/2015 | Wolinsky | G06Q 20/3274 |
| | | | 705/14.38 |
| 2015/0127483 A1* | 5/2015 | Elliot | G06Q 30/0633 |
| | | | 705/26.8 |
| 2016/0239796 A1* | 8/2016 | Grant | G06Q 30/06 |
| 2016/0350706 A1* | 12/2016 | Endries | G06Q 10/08 |
| 2017/0244167 A1* | 8/2017 | Mak | H01Q 1/2225 |
| 2018/0121778 A1* | 5/2018 | Jung | G06K 19/0726 |
| 2018/0173896 A1* | 6/2018 | Arneson | G06F 21/6254 |
| 2019/0228436 A1* | 7/2019 | Joao | G06K 7/10386 |
| 2019/0332912 A1* | 10/2019 | Walker | G06K 7/10386 |
| 2019/0373433 A1* | 12/2019 | Gabriele | H04W 24/08 |
| 2020/0005113 A1* | 1/2020 | Schnippering | G06K 19/07777 |
| 2020/0405078 A1* | 12/2020 | Martin | A47F 5/025 |
| 2022/0156339 A1* | 5/2022 | Grajales | G06Q 10/1095 |
| 2022/0223019 A1* | 7/2022 | Shakedd | G08B 13/2417 |

* cited by examiner

PRODUCT INFORMATION SYSTEMS AND METHODS

CROSS-REFERENCE TO RELATED APPLICATIONS

This application relates to and claims priority benefits from U.S. Provisional Application No. 63/389,962, entitled "Securing Assembly Having Communication Device," filed Jul. 18, 2022, which is hereby incorporated by reference in its entirety.

This application also relates to and claims priority benefits from U.S. Provisional Application No. 63/410,307, entitled "Securing Assembly," filed Sep. 27, 2022, which is hereby incorporated by reference in its entirety.

This application also relates to and claims priority benefits from U.S. Provisional Application No. 63/420,786, entitled "Securing Assembly Having Communication Device," filed Oct. 31, 2022, which is hereby incorporated by reference in its entirety.

This application relates to and claims priority benefits from U.S. Provisional Application No. 63/387,103, entitled "Securing Assembly Including a Suction Cup and a Coupling Layer Secured to the Suction Cup," filed Dec. 13, 2022, which is hereby incorporated by reference in its entirety.

FIELD OF THE DISCLOSURE

Examples of the present disclosure generally relate to product information systems and methods, such as can provide information about one or more products in response to being engaged by a device of an individual.

BACKGROUND OF THE DISCLOSURE

Various commercial enterprises offer goods for sale. Many establishments offer a large number products for sale. Separate and distinct signs may be used to provide point of sale and product information for certain products. However, such signs occupy space, which may otherwise be used for products. Further, such signs may not provide sufficient information regarding a product. For example, the signs may not be large enough to provide sufficient details and information about a product.

SUMMARY OF THE DISCLOSURE

A need exists for system and a method that allow an individual to quickly and easily determine information regarding a product, service, and/or the like.

With that need in mind, certain examples of the present disclosure provide a product information system including a housing, and a communication device coupled to the housing. The communication device is configured to provide information regarding one or more products in response to being engaged by a device of an individual.

The housing can include a rear panel secured to a front panel.

In at least one example, the housing includes a clip that removably retains a card. The card retains the communication device.

In at least one example, the clip includes a tap indicia. The tap indicia provides an area where the individual can tap the device to engage the communication device.

The card can include a plurality of defined slots configured to receive and retain reciprocal protrusions of the clip.

The card can includes one or both of a graphics or text regarding the one or more products.

In at least one example, the communication device is secured within folded portions of the card.

The product information system can also include a securing assembly coupled to the housing.

As an example, the securing assembly includes a moveable joint that moveably couples the housing to a mount. The moveable joint can be a ball and socket joint.

The securing assembly can include a flexible layer of nanotechnology gel.

In at least one example, the securing assembly comprises a suction cup assembly. The suction cup assembly can include a flexible layer of nanotechnology gel.

In at least one example, the securing assembly includes a stand.

The communication device can be secured to the securing assembly.

The securing assembly can include a suction cup and a suction securing nut. The communication device can be disposed between and within one or both of the suction cup and the suction securing nut. The securing assembly can also include an insert mount that fits within or around a stem of the suction cup. The communication device can be mounted on the insert mount.

The communication device can be secured to the suction cup. Optionally, the communication device can be secured to the suction securing nut.

In at least one example, the communication device includes a near field communication chip.

In at least one example, the housing includes a front ring removably secured to a rear ring. A central passage is formed through the ring. The communication device is aligned with the central passage.

In at least one example, the housing includes a front ring secured to a rear retainer. The rear retainer secures to a rail by a retaining clip and a tap screw.

Certain examples of the present disclosure provide a product information method including coupling a communication device to a housing; and providing, by the communication device, information regarding one or more products in response to the communication device being engaged by a device of an individual.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide product information systems and methods. The systems and methods include a housing, and a communication device coupled to the housing. The communication device can be a near field communication tag. The communication device can be contained on or within a card, and thereby provide a smart card.

Figure 1:
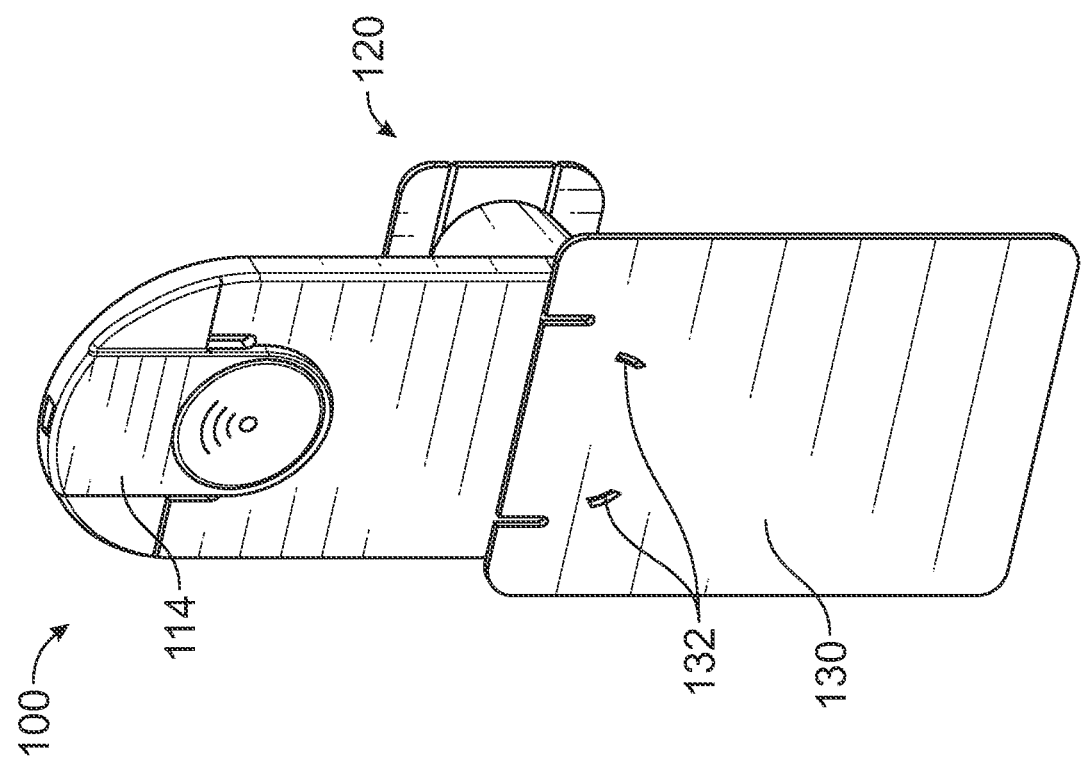
FIG. 1 illustrates a front isometric view of a product information system, according to an example of the present disclosure.

FIG. 1 illustrates a front isometric view of a product information system 100, according to an example of the present disclosure. The product information system 100 includes a housing 102, which can include a rear panel 104 secured to a front panel 105. Optionally, the housing 102 can include a single, unitary panel. The housing 102 includes a base 106, which can include a flat, planar surface 108. The base 106 can be a front surface of the front panel 105, for example. A bottom ledge 110 of the rear panel 104 extends from a lower edge 112. The bottom ledge 110 is configured to snapably secure to a reciprocal recess of the front panel 105.

An upper clip 114 extends downwardly from an upper edge 116 of the housing 102 over an upper portion of the surface 108. The upper clip 114 is separated from the surface 108 by a gap. The upper clip 114 includes a tap indicia 118. The tap indicia 118 is an area where an individual can tap a smart device (such as a smart phone, tablet, or the like) to receive information regarding a product, as described herein. The tap indicia 118 provides a graphic, text, and/or the like that indicates where an individual should move a handheld smart device (for example, by tapping, waving, or otherwise moving in close proximity, such as within 10 centimeters or less) to receive information regarding product(s).

The product information system 100 also includes a securing assembly 120 coupled to the housing 102. In at least one example, the housing 102 forms at least a part of the securing assembly 120. In at least one example, the securing assembly 120 includes a moveable joint 122 that moveably couples the housing 102 to a mount 124. As an example, the joint 122 can be a ball and socket joint. As another example, the joint 122 can be an articulating arm. As another example, the joint 122 can be a fixed, non-movable connection.

Figure 2:
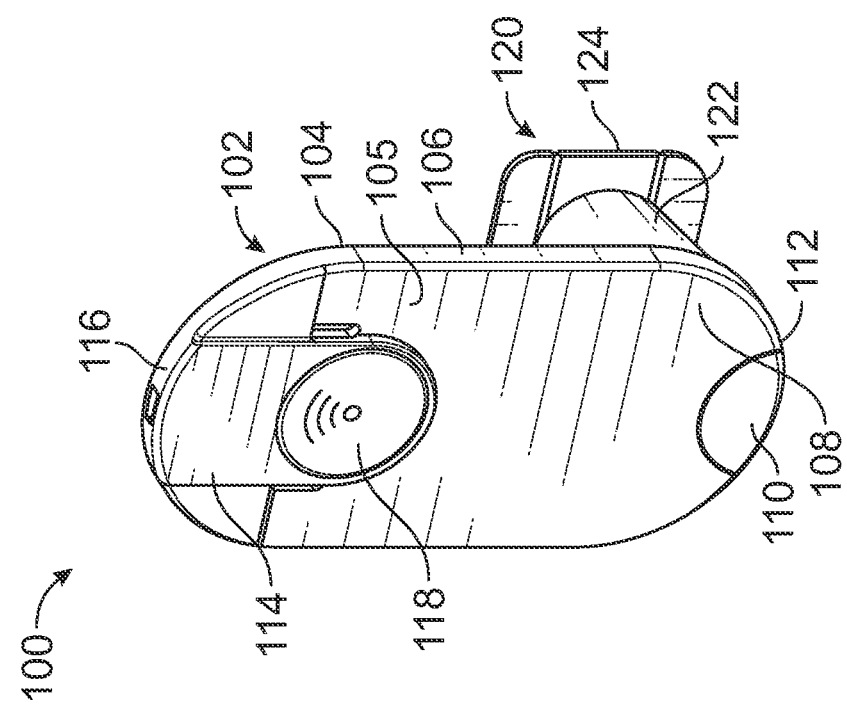
FIG. 2 illustrates a front isometric view of the product information system receiving a smart card, according to an example of the present disclosure.

FIG. 2 illustrates a front isometric view of the product information system 100 receiving a card 130, according to an example of the present disclosure. Referring to FIGS. 1 and 2, the card 130 can be a planar sheet that is configured to be retained on the base 106 by the upper clip 114. As shown, the card 130 can include a plurality of defined slots 132 that are configured to receive and retain reciprocal protrusions (such as tabs, barbs, nubs, posts, and/or the like) extending from a lower surface of the upper clip 114 to secure the card 130 in a stable position.

In at least one example, the card 130 can include graphics, texts, and/or the like that provides information for a product. For example, the card 130 can include an advertisement for a product. The card 130 can include a communication device, such as a near field communication chip, as described herein. In this manner, the card 130 can be a smart card. Optionally, the card 130 may not include a communication device. Instead, a communication device can be separately secured to the housing 102, for example.

Figure 3:
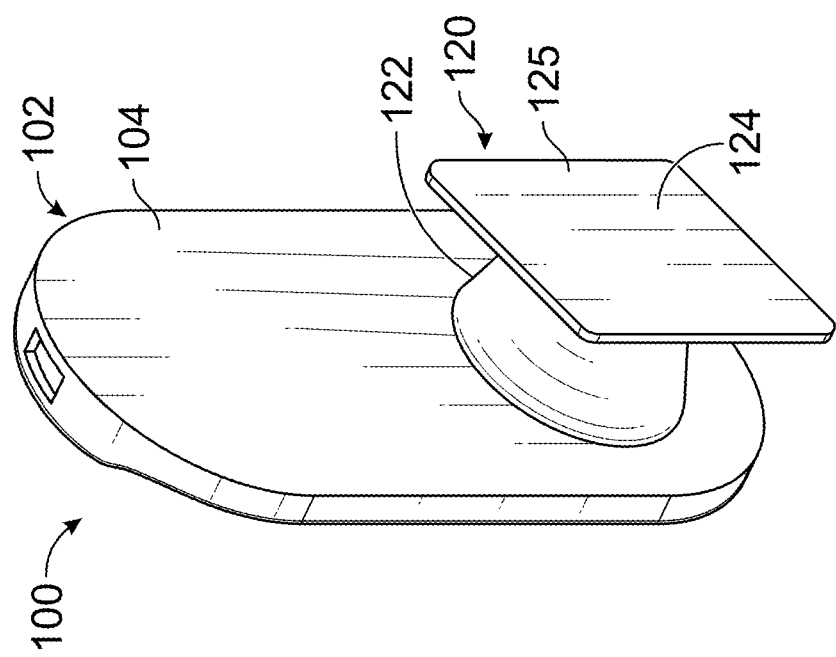
FIG. 3 illustrates a rear isometric view of the product information system, according to an example of the present disclosure.

FIG. 3 illustrates a rear isometric view of the product information system 100, according to an example of the present disclosure. In at least one example, the mount 124 includes a flexible layer 125 of nanotechnology gel, which is configured to secure the product information system 100 to a surface. For example, the mount 124 is configured to removably secure to a front surface of a door of a refrigerated compartment. As another example, the mount 124 can removably secure to a surface of a wall, a table, a countertop, a desk, and/or the like. Instead of the flexible layer 125 of nanotechnology gel, the mount 124 can be or otherwise include a suction cup assembly. As another example, the mount 124 can include the suction cup assembly having a flexible layer of nanotechnology gel.

Figure 4:
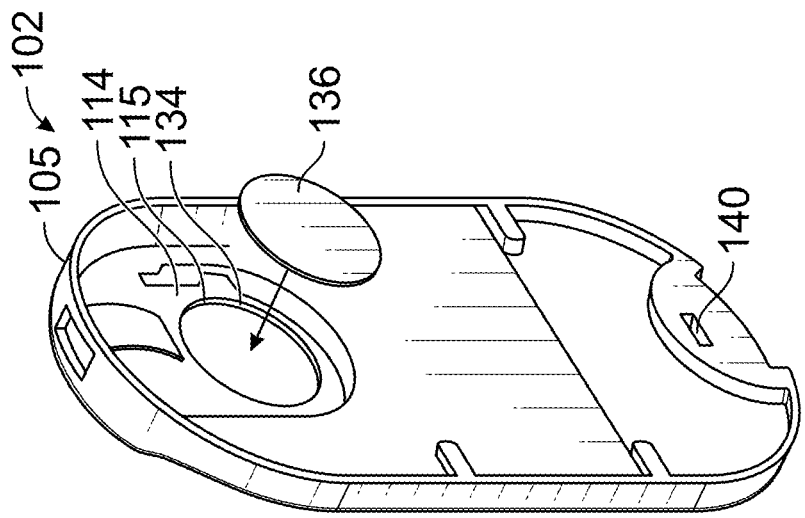
FIG. 4 illustrates a rear isometric view of a front panel of a housing, according to an example of the present disclosure.

FIG. 4 illustrates a rear isometric view of the front panel 105 of the housing 102, according to an example of the present disclosure. A rear surface of the clip 114 can include an area 134 that is configured to receive and retain a communication device 136, such as a chip, radio frequency identification (RFID) tag, and/or the like. In at least one example, the communication device 136 is a near field communication (NFC) chip decal that is configured to couple to the rear surface 115 of the clip 114. The communication device 136 can be directly secured to the area 134. As another example, the communication device 136 is retained on and/or within the card 130, as described herein.

Figure 5:
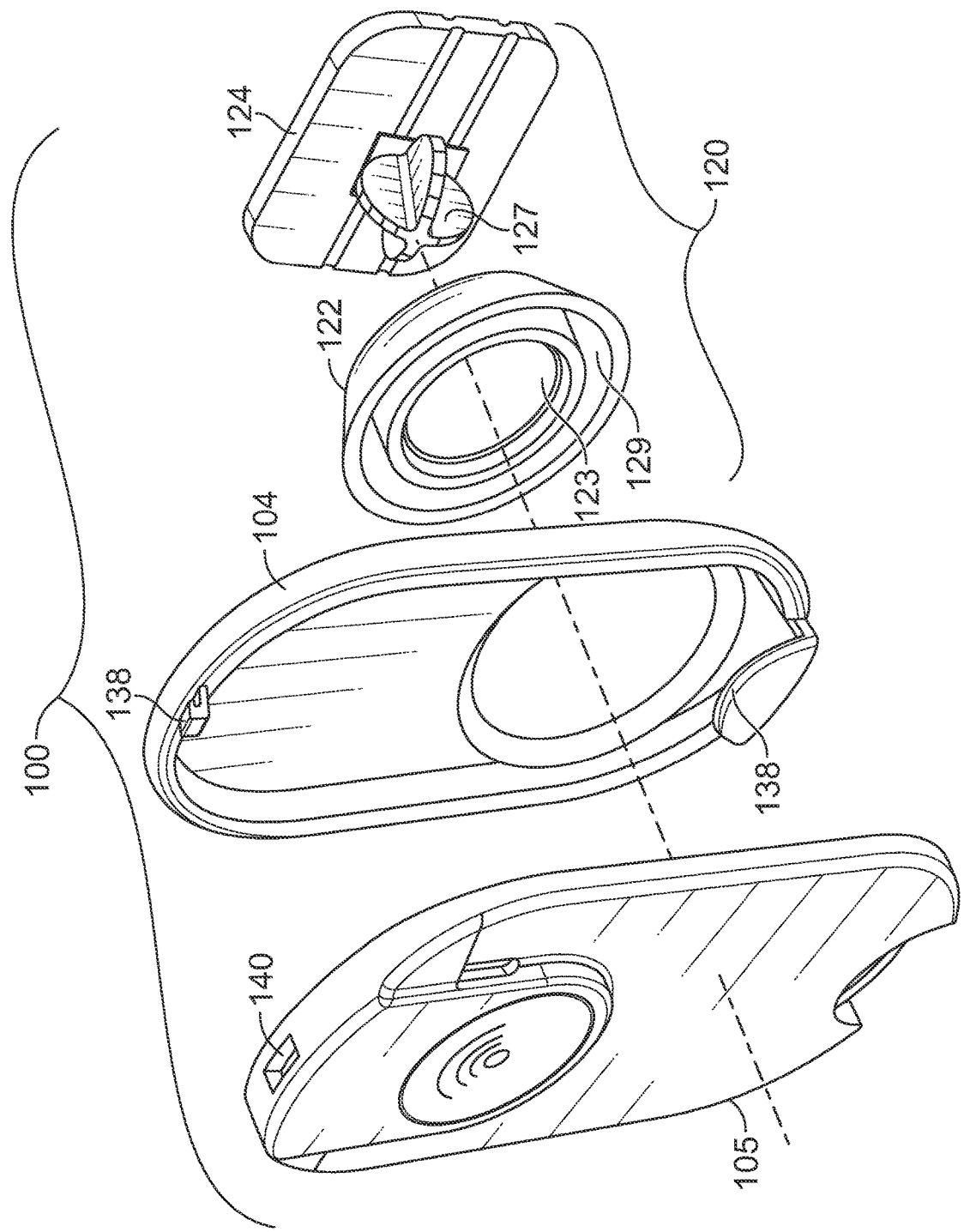
FIG. 5 illustrates a front isometric exploded view of the product information system, according to an example of the present disclosure.

FIG. 5 illustrates a front isometric exploded view of the product information system 100. As shown, the front panel 105 can snapably secure to the rear panel 104, such as through one or more deflectable tabs 138 that secure into reciprocal slots 140. A ball 127 extending from a front surface of the mount 124 can be moveably retained within a reciprocal bearing 123 of the joint 122. The joint 122 can include a cap 129 surrounding the bearing 123. The cap 129 can be configured to threadably secured to a reciprocal structure on a rear surface of the rear panel 104.

Figure 6:
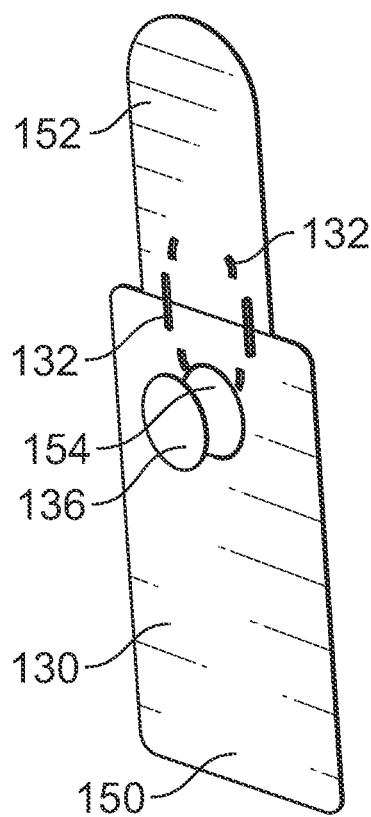
FIG. 6 illustrates a front view of a card and a communication device, according to an example of the present disclosure.

FIG. 6 illustrates a front view of the card 130 and the communication device 136, according to an example of the present disclosure. As shown, the card 130 can include a base sheet 150 and a retainer sheet 152 extending upwardly from the base sheet 150. The slots 132 provide openings sized and shaped to align with protrusions (such as tabs) of the clip 114 (shown in FIGS. 1 and 2, for example). The communication device 136, such as an NFC chip decal, is secured to a defined location 154 on the card 130. The defined location 154 is configured to be underneath the tap indicia 118 (shown in FIG. 1, for example) by way of the protrusions being retained by overlapping slots 132.

Figure 7:
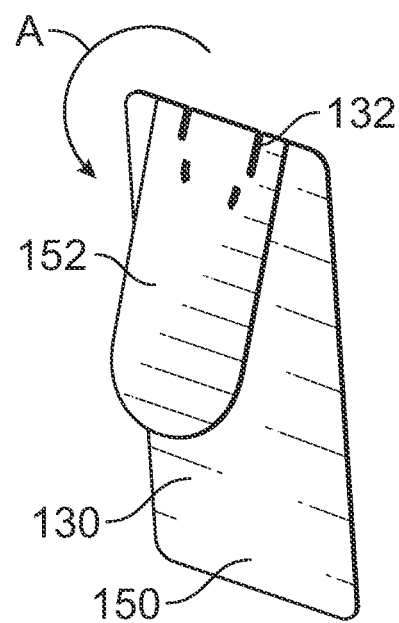
FIG. 7 illustrates a front view of the card securing the communication device, according to an example of the present disclosure.

FIG. 7 illustrates a front view of the card 130 securing the communication device 136, according to an example of the present disclosure. As described herein, the communication device 136 can be retained within folded portions of the card 130. For example, referring to FIGS. 6 and 7, the retainer sheet 152 is folded over the base sheet 150 to securely sandwich the communication device 136 therebetween. After the retainer sheet 152 is folded over the base sheet 150, the slots 132 of each are aligned, and configured to retain protrusions of the clip 114. Optionally, the card 130 may not be configured to have foldable portions. Instead, the communication device 136 can be configured to adhere to a surface of the card 130 without any portions being folded over to secure the communication device 136 in place.

Figure 8:
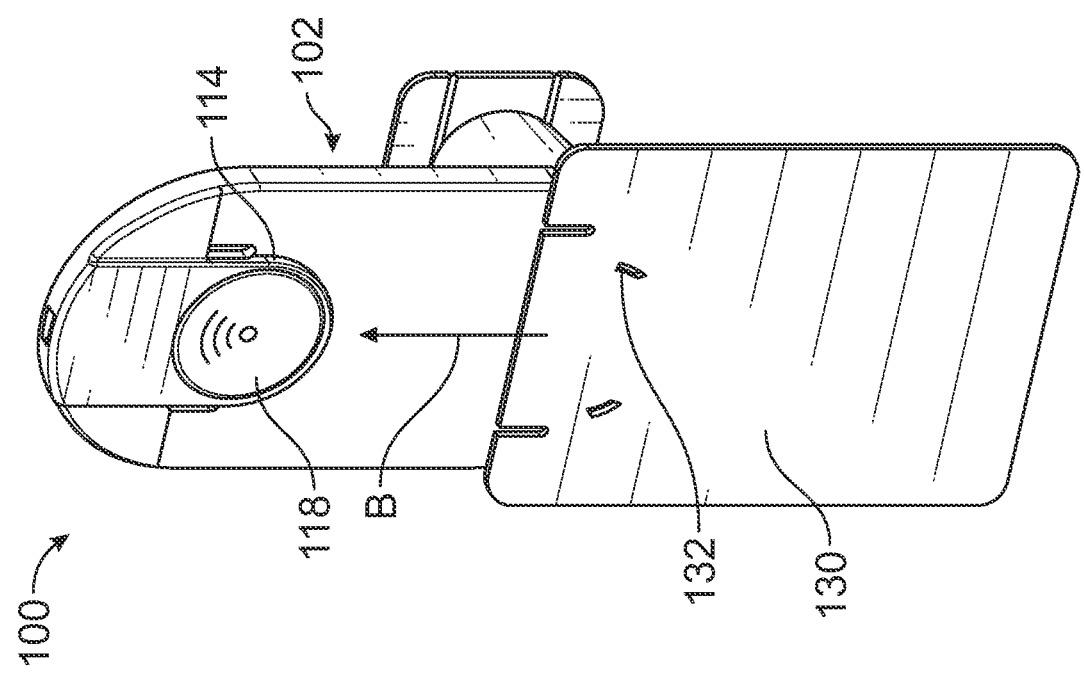
FIG. 8 illustrates a front isometric view of the card being coupled to the housing of the product information system, according to an example of the present disclosure.

FIG. 8 illustrates a front isometric view of the card 130 being coupled to the housing 102 of the product information system 100, according to an example of the present disclosure. Referring to FIGS. 6-8, the card 130 includes the communication device 136. The card 130 is then inserted upwardly in the direction of arrow B so that the slots 132 engage the protrusions of the clip 114, thereby securing the card 130 to the housing 102. The card 130 is disposed behind the tap indicia 118.

Figure 9:
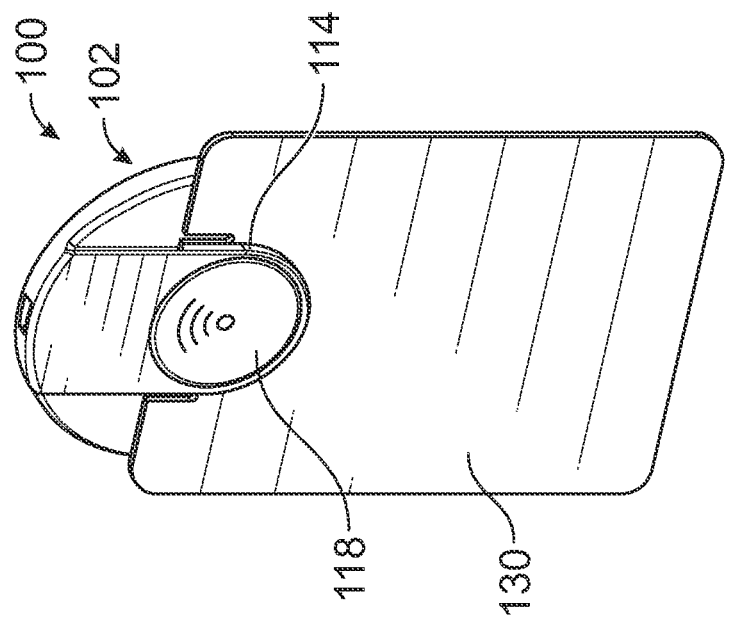
FIG. 9 illustrates a front isometric view of the product information system having the card, according to an example of the present disclosure.

FIG. 9 illustrates a front isometric view of the product information system 100 having the card 130, according to an example of the present disclosure. As shown, the card 130 may be secured to the housing 102 by the clip 114, and may extend below a lower edge of the housing 102.

Referring to FIGS. 1-9, the card 130 having the communication device 136 provides a smart card. The communication device 136 is configured to provide product information in response to an individual placing a smart device in proximity to the tap indicia 118.

The product information system 100 can be used in conjunction with a product holder system. As another example, the product information system 100 can be separate from a product holder system.

The communication device 136 can include a control unit, one or more processors, and/or the like. For example, the communication device 136 device can be a near field communication (NFC) tag. As another example, the communication device 136 can be a radio frequency identification (RFID) tag. The communication device can be on or within the card 130. As another example, the card 130 itself is or otherwise provides the communication device.

In operation, an individual positions a handheld device, such as a smart phone, tablet, or the like, in close proximity (such within 10 centimeters or less, and/or by tapping with the handheld device) to the tap indicia 118. In response, the communication device 136 one or both of outputs information to the handheld device (such as information regarding a product, service, advertisement, promotion, and/or the like), and/or automatically directs the handheld device to an information source (such as a website) that provides the information.

As described herein, the product information system 100 includes the housing 102, which retains the card 130, and can attach to multiple display locations in retail environments. The card 130 having the communication device 136 is configured to provide near field communication (NFC) to mobile phones and devices at the point of display while shoppers are in the process of shopping. NFC chips can be attached to the housing 102 directly, or attached to or embedded within the card 130, which are inserted into and/or onto the housing 102.

When individuals place a smart device (such as a mobile smart phone) within ~1 inch of a noted tap location (for example, the tap indicia 118) identified on the holder, the smart device recognizes the communication device 136, such as an NFC chip, which triggers the smart device to connect to a URL address programmed into the NFC chip.

The housing 102 having the clip 114 can be used either by itself or attached to the securing assembly 120. The clip 114 allows different cards to be selectively inserted, and locked in place. The communication device 136 can be either directly applied to the clip 114 or to the card 130 depending on a desired usage.

In at least one example, the securing assembly 120 includes a housing connected to a ball and socket-type mount. The ball and socket mount allows the device to be rotated and located into multiple positions as needed to face the shopper in the most optimal position. Optionally, the securing assembly can include a suction cup. As another example, the securing assembly may not include a ball and socket.

In at least one example, the securing assembly 120 can include a suction cup that couples to a suction securing nut (or knob) and/or a securing mount, which can be integrally formed with a bracket, as described in U.S. Pat. No. 10,104,986, entitled "Systems and Methods for Securing and Displaying Products," which is hereby incorporated by reference in its entirety. Optionally, the securing assembly 120 can include locking rings, or other such features that separately couple to the bracket. As another example, the securing assembly 120 can be configured as described in U.S. Pat. No. 10,393,168, entitled "Securing Assembly," which is hereby incorporated by reference in its entirety. As another example, the securing assembly 120 can include a suction cup permanently secured to a bracket. For example, a suction cup can extend from a portion of the bracket. In at least one other example, instead of a suction cup, the securing assembly 120 can includes a flange or other such structure coated with a nanotechnology gel, which is similar to an adhesive, but can be removed and reused.

Figure 10:
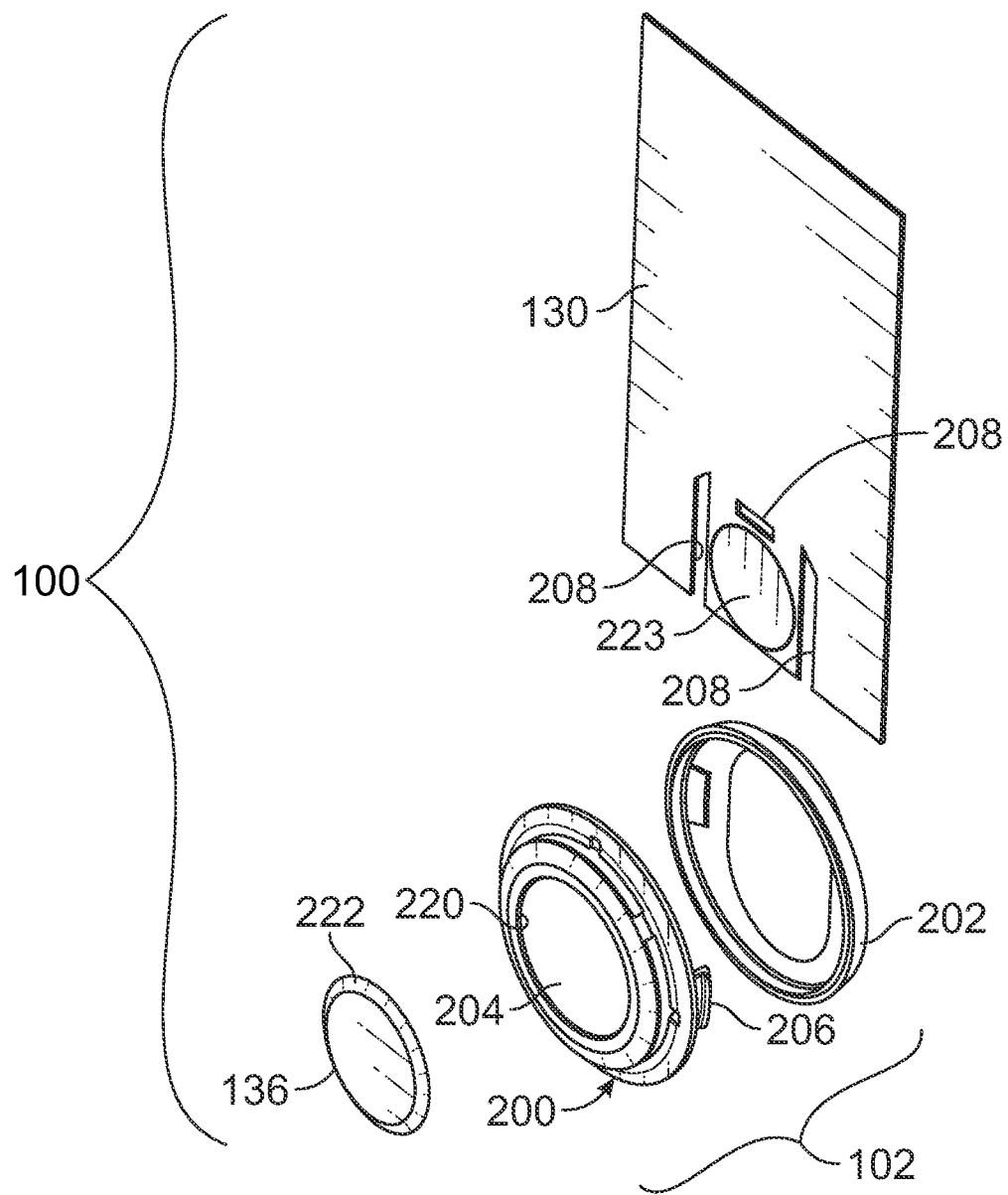
FIG. 10 illustrates a front isometric exploded view of a product information system, according to an example of the present disclosure.

FIG. 10 illustrates a front isometric exploded view of a product information system 100, according to an example of the present disclosure. In this example, the housing 102 includes a front ring 200 and a rear ring 202. The front ring 200 is configured to snapably secure to the rear ring 202. A central passage 204 is formed through the front ring 200.

The communication device 136 is configured to be aligned (such as substantially axially aligned—for example, within +/−5 degrees) with the central passage 204. For example, the communication device 136 can be secured to the card 130 within the central passage 204. As another example, the communication device 136 can be retained within the central passage 204 between the front ring 200 and the rear ring 202 without a separate card.

The front ring 200 includes protrusions 206, such as fins, tabs, or the like, that are configured to be retained within reciprocal openings 208 of the card 130. The communication device 136 can include the tap indicia, and is retained on the card 130 by the housing 102. For example, an interior rim 220 of the front ring 200 may sandwich an outer rim 222 of the communication device 136 against a front surface of the card 130. Optionally, the communication device 136 can be adhesively secured to an area 223 of the card 130, and the front ring 200 and the rear ring 202 can then be snapably secured together and positioned on the card 130.

The card 130 can be folded over itself to securely contain the communication device 136 between folded portions. Optionally, the card 130 may not be configured to fold over a portion of the communication device 136. Instead, the communication device 136 can be secured to the area 223, either directly, and/or by the housing 102.

As shown, the product information system 100 may not include a separate securing assembly. Instead, the rear ring 202 may include a coupler, such as a nanotechnology gel. As another example, the card 130 can include a strap, wire, string, or the like that is configured to allow the product information system 100 to hang from a hook, for example, As another example, the card 130 can include a coupler, such as a nanotechnology gel. As another example, the housing 102 may be configured to be retained by a stand.

Figure 11:
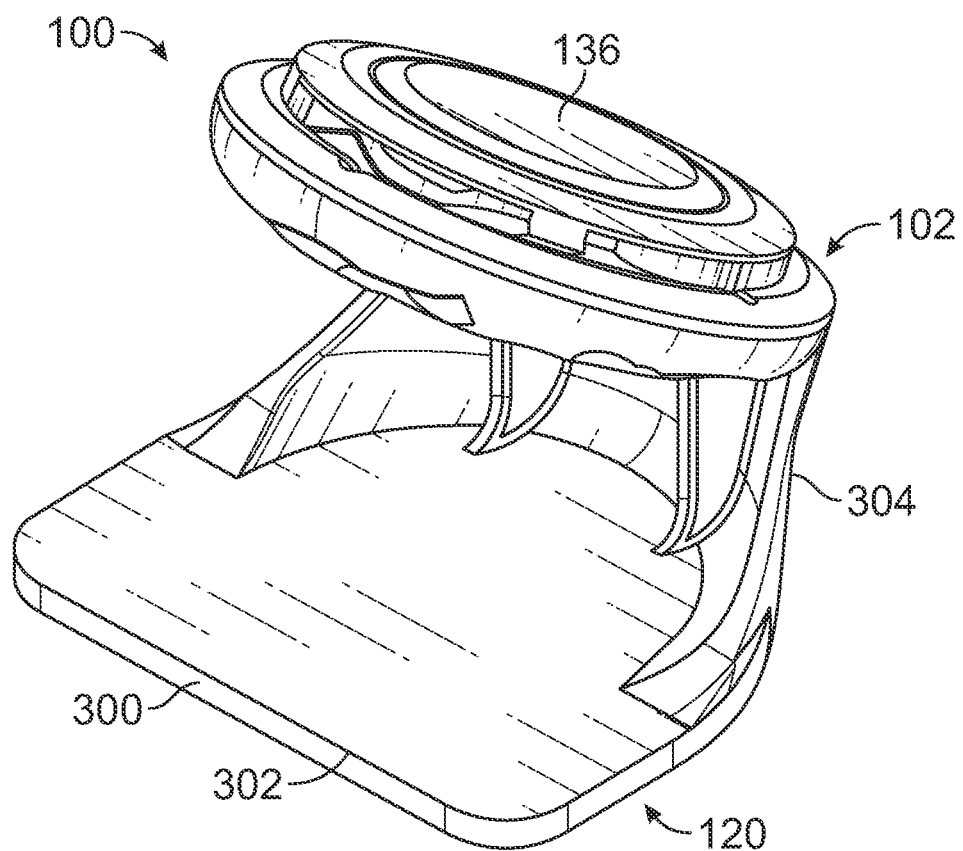
FIG. 11 illustrates an isometric view of a product information system, according to an example of the present disclosure.
Figure 12:
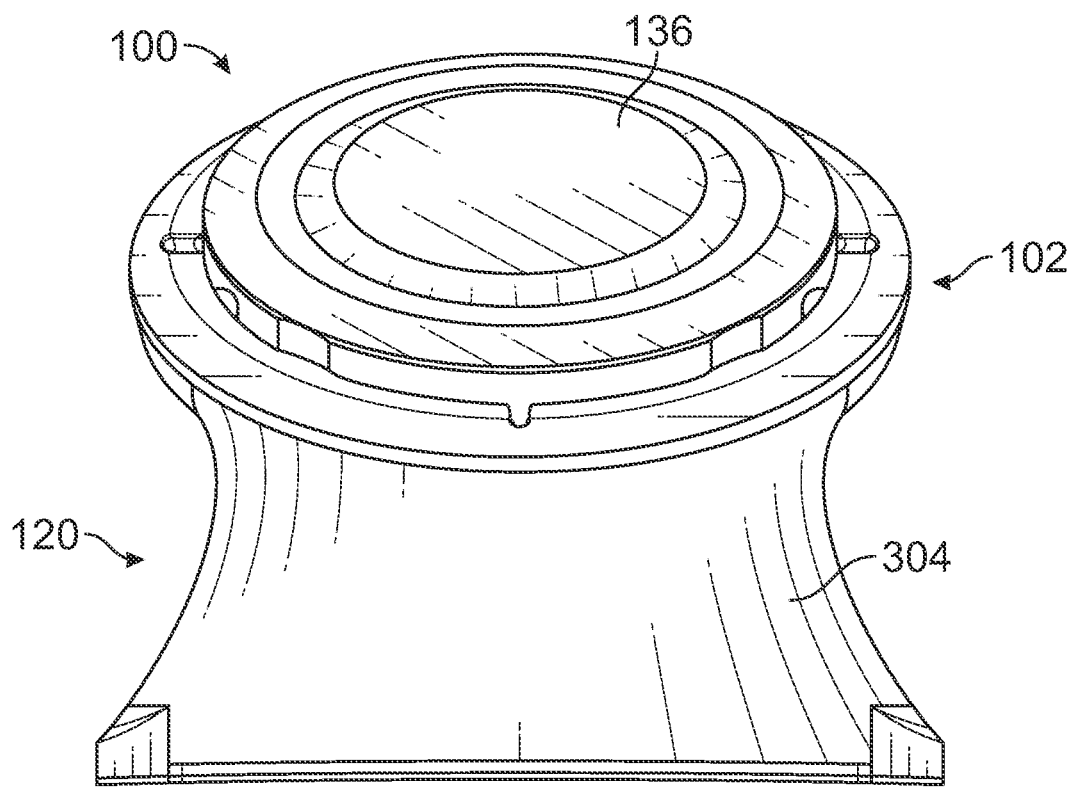
FIG. 12 illustrate a front view of the product information system of FIG. 11.
Figure 13:
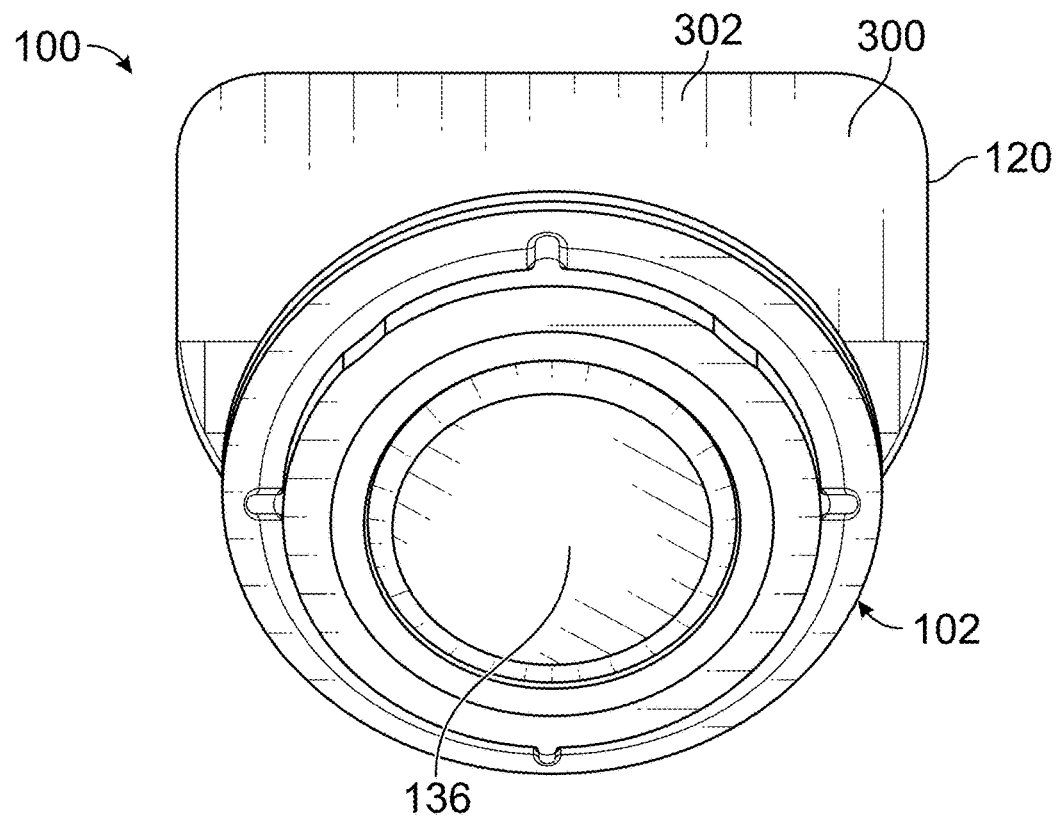
FIG. 13 illustrates a top view of the product information system of FIG. 11.
Figure 14:
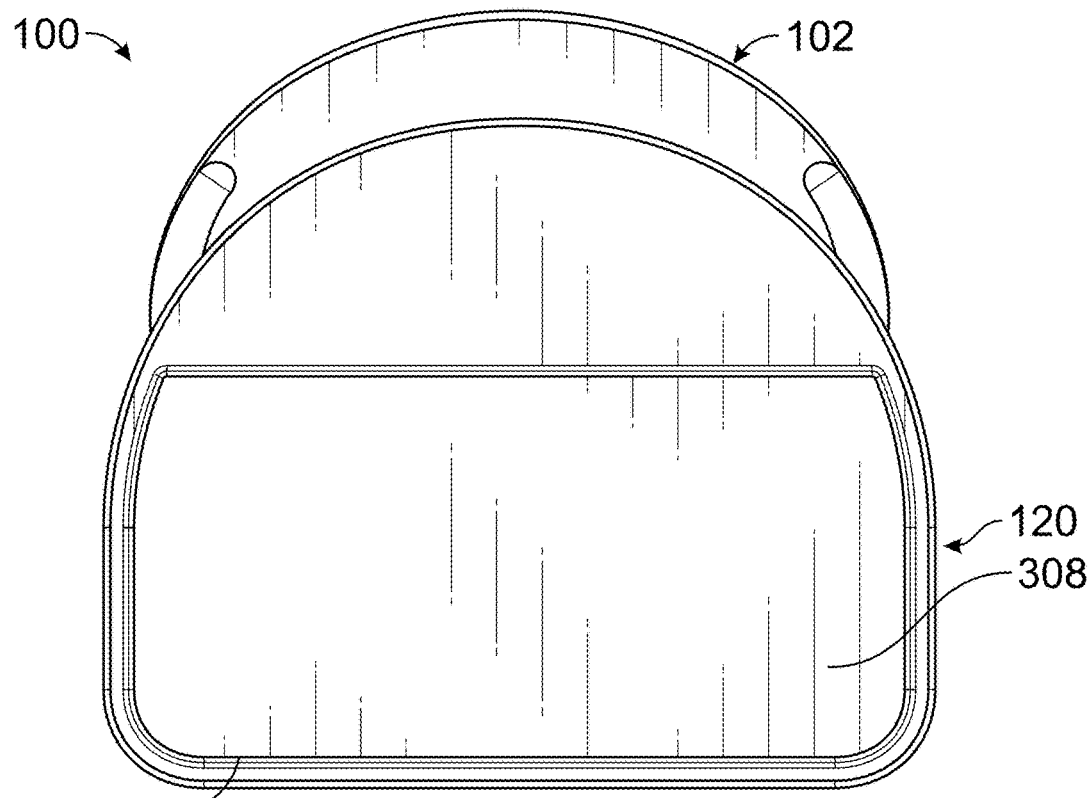
FIG. 14 illustrates a bottom view of the product information system of FIG. 11.
Figure 15:
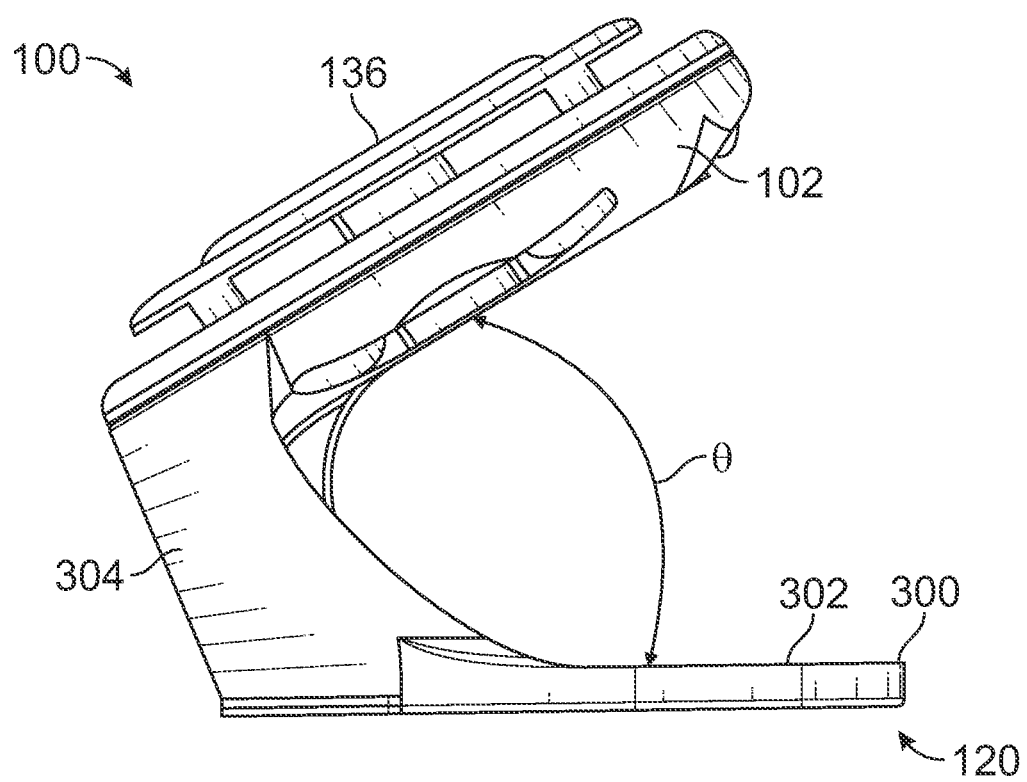
FIG. 15 illustrates a lateral view of the product information system of FIG. 11.

FIG. 11 illustrates an isometric view of a product information system 100, according to an example of the present disclosure. FIG. 12 illustrate a front view of the product information system 100 of FIG. 11. FIG. 13 illustrates a top view of the product information system 100 of FIG. 11. FIG. 14 illustrates a bottom view of the product information system 100 of FIG. 11. FIG. 15 illustrates a lateral view of the product information system 100 of FIG. 11.

Referring to FIGS. 11-15, the communication device 136 can be retained by the housing 102, such as any of those described herein, without a separate card. Optionally, the communication device 136 can be secured to the card, which can then be secured to the housing 102, as shown and described herein. Further, the housing 102 is secured to a securing assembly 120, which can be a stand 300. The stand 300 includes a base 302 that is configured to be supported on a surface, such as a countertop, table, desk, or the like. An extension wall 304 outwardly extends from the base 302 to outwardly extend the communication device 136. The extension wall 304 can be angled to set the housing 102 and the communication device 136 retained by the housing 102 as an angle θ with respect to the base 302. A bottom surface 306 can include a nanotechnology gel 308, as described herein.

Figure 16:
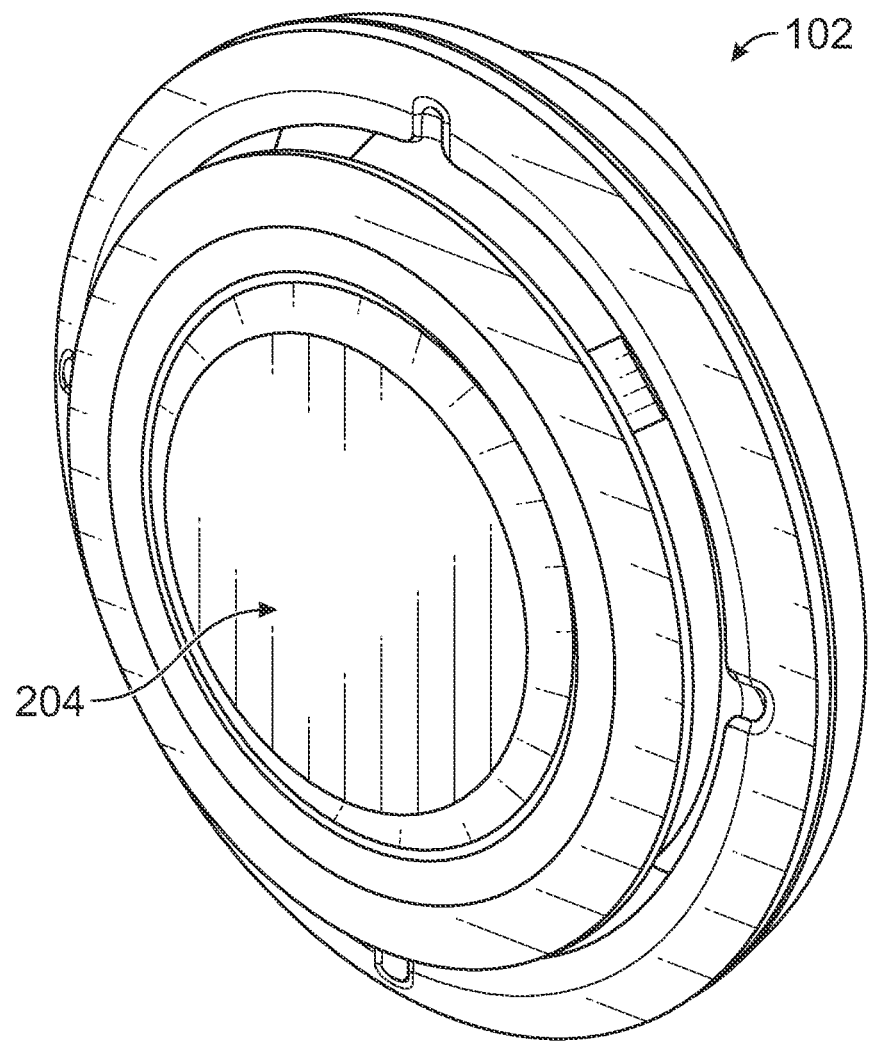
FIG. 16 illustrates an isometric front view of a housing, according to an example of the present disclosure.
Figure 17:
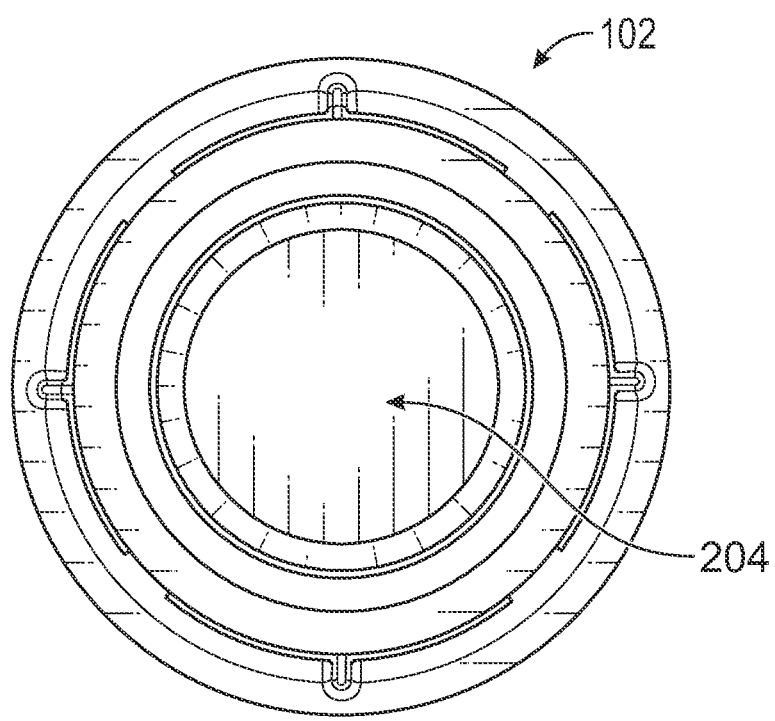
FIG. 17 illustrates a front view of the housing of FIG. 16.
Figure 18:
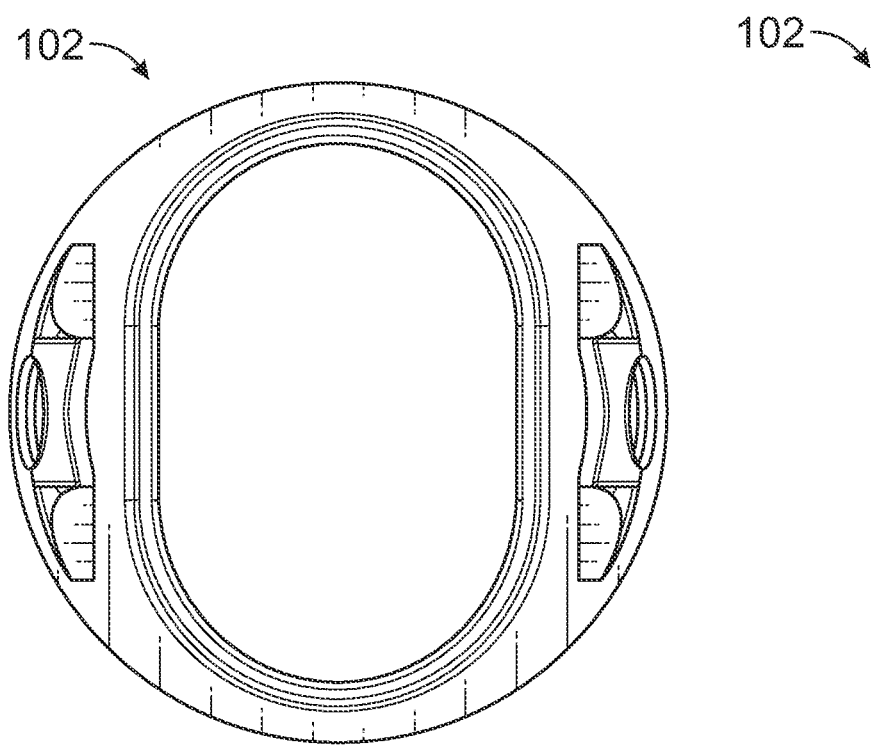
FIG. 18 illustrates a rear view of the housing of FIG. 16.
Figure 19:
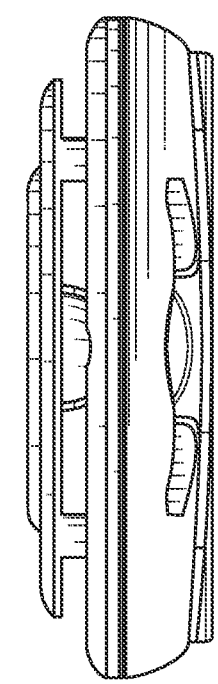
FIG. 19 illustrates a lateral view of the housing of FIG. 16.

FIG. 16 illustrates an isometric front view of a housing 102, according to an example of the present disclosure. FIG. 17 illustrates a front view of the housing 102 of FIG. 16. FIG. 18 illustrates a rear view of the housing 102 of FIG. 16. FIG. 19 illustrates a lateral view of the housing 102 of FIG. 16.

Referring to FIGS. 16-19, the housing 102 can be used to securely retain a communication device. The housing 102 can be used with any of the examples shown and described herein. The housing 102 can be coupled to a securing assembly. Optionally, the housing 102 can be used without a securing assembly. The housing 102 can retain a communication device by itself, or in conjunction with a card, as described herein.

Figure 20:
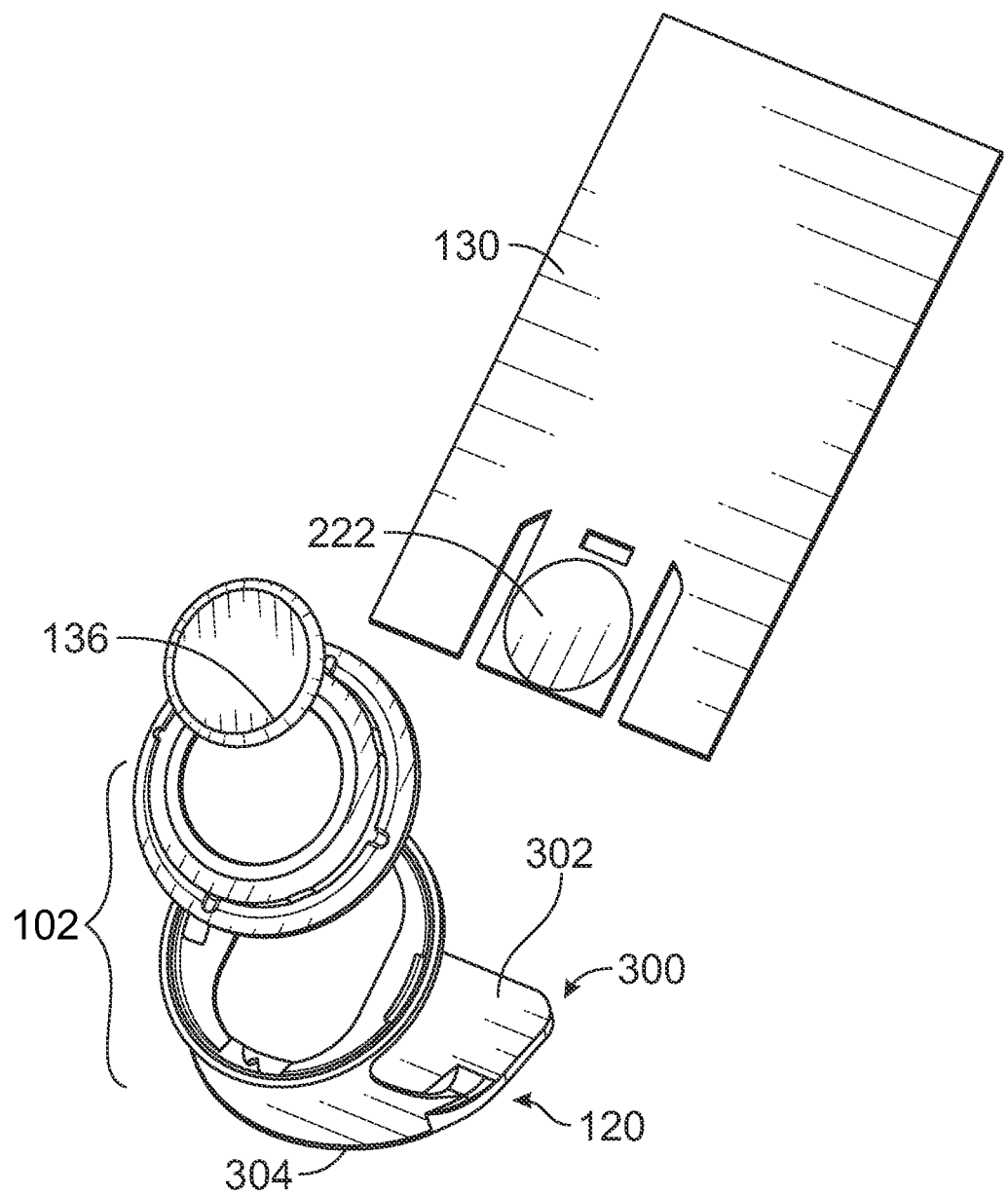
FIG. 20 illustrates an isometric exploded view of a product information system, according to an example of the present disclosure.

FIG. 20 illustrates an isometric exploded view of a product information system 100, according to an example of the present disclosure. Referring to FIGS. 11-20, the communication device 136 can be secured to the area 223 of the card 130. The housing 102 retains the card 130. The stand 300 supports the card 130 and the communication device 136 in an upward position, such as when the stand 300 is supported on a surface.

Figure 21:
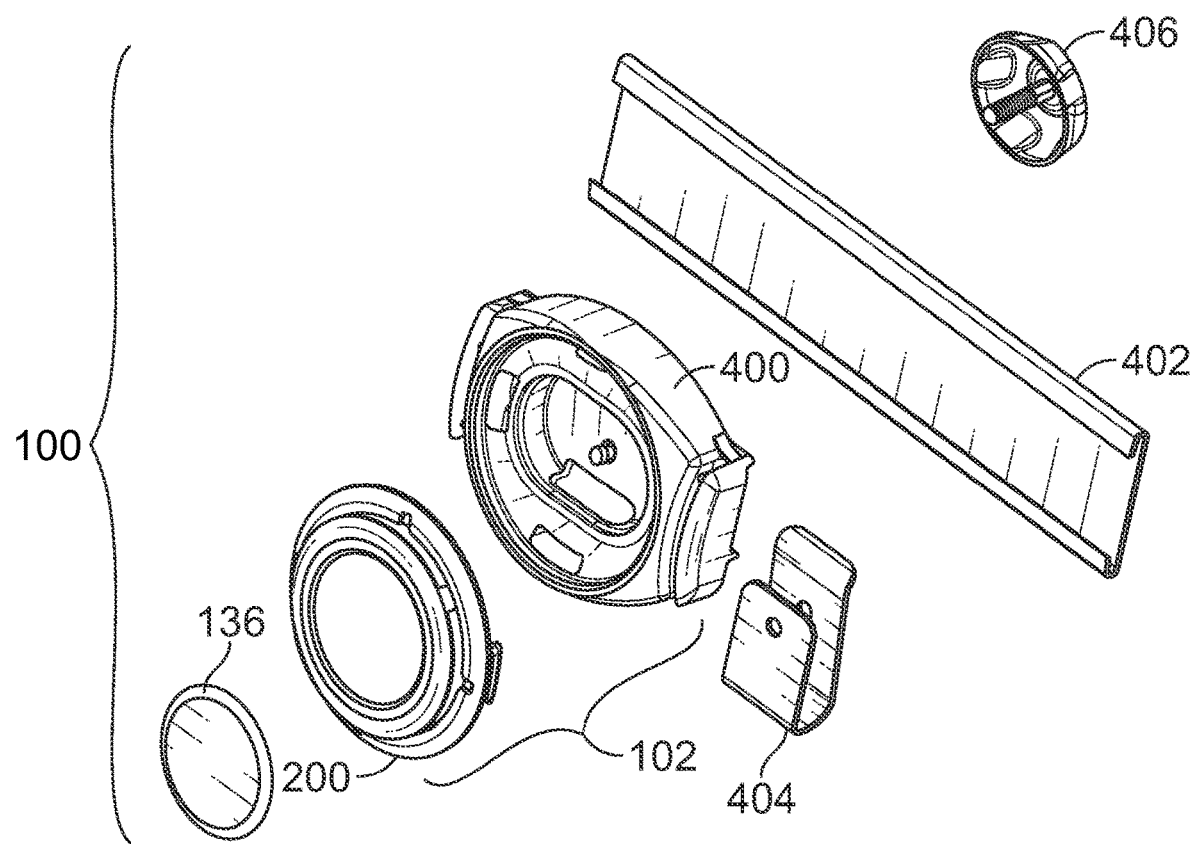
FIG. 21 illustrates an isometric exploded view of a product information system, according to an example of the present disclosure.
Figure 22:
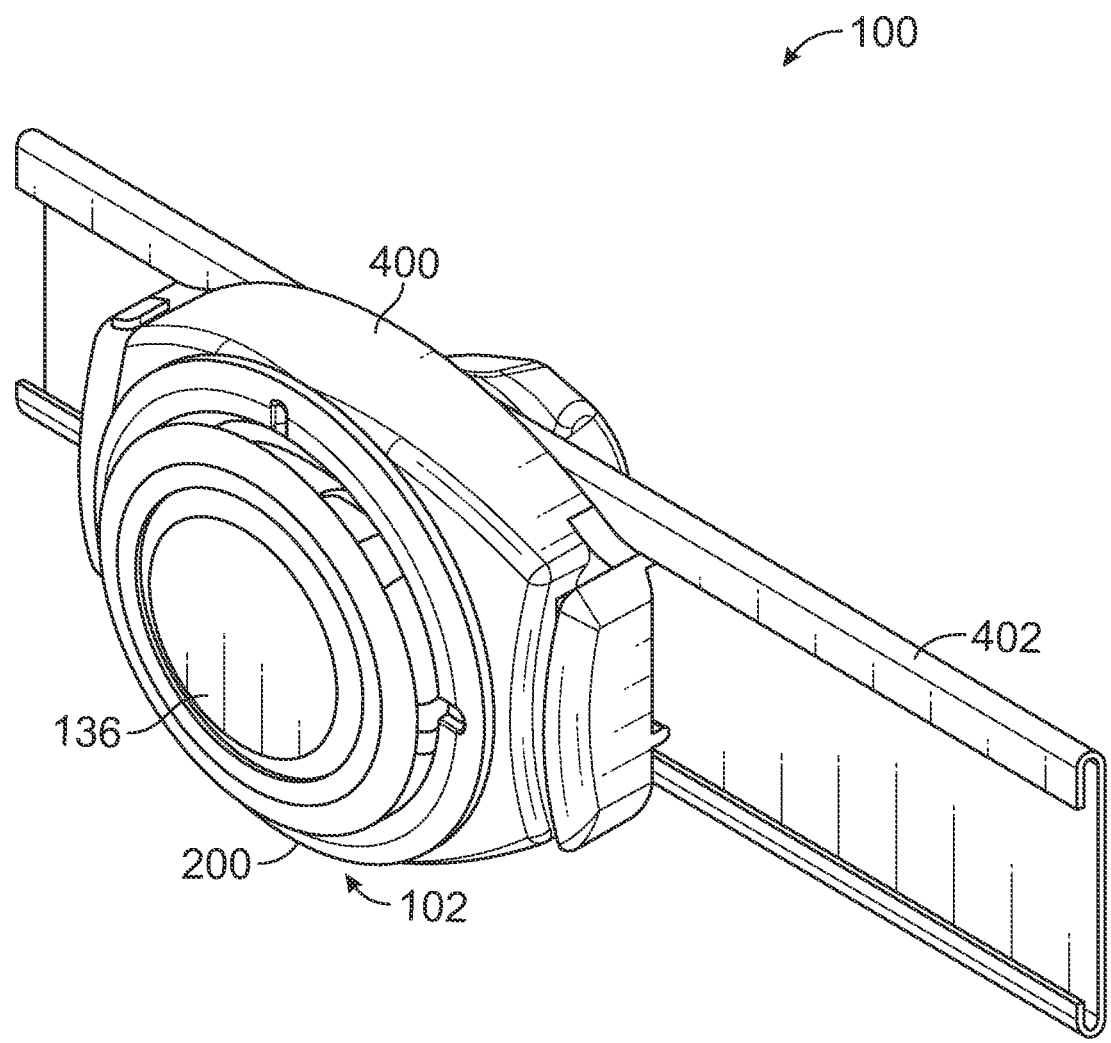
FIG. 22 illustrates an isometric front view of the product information system of FIG. 21.
Figure 23:
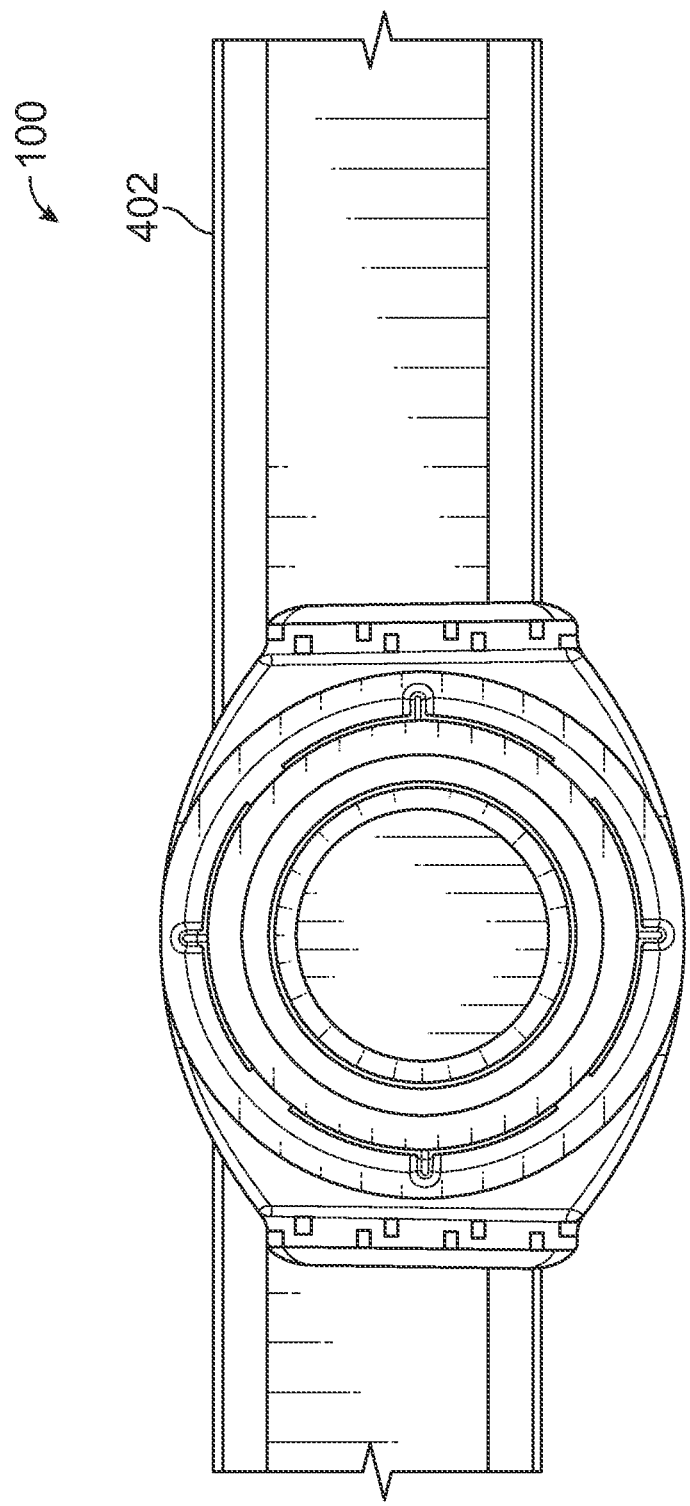
FIG. 23 illustrates a front view of the product information system of FIG. 21.
Figure 24:
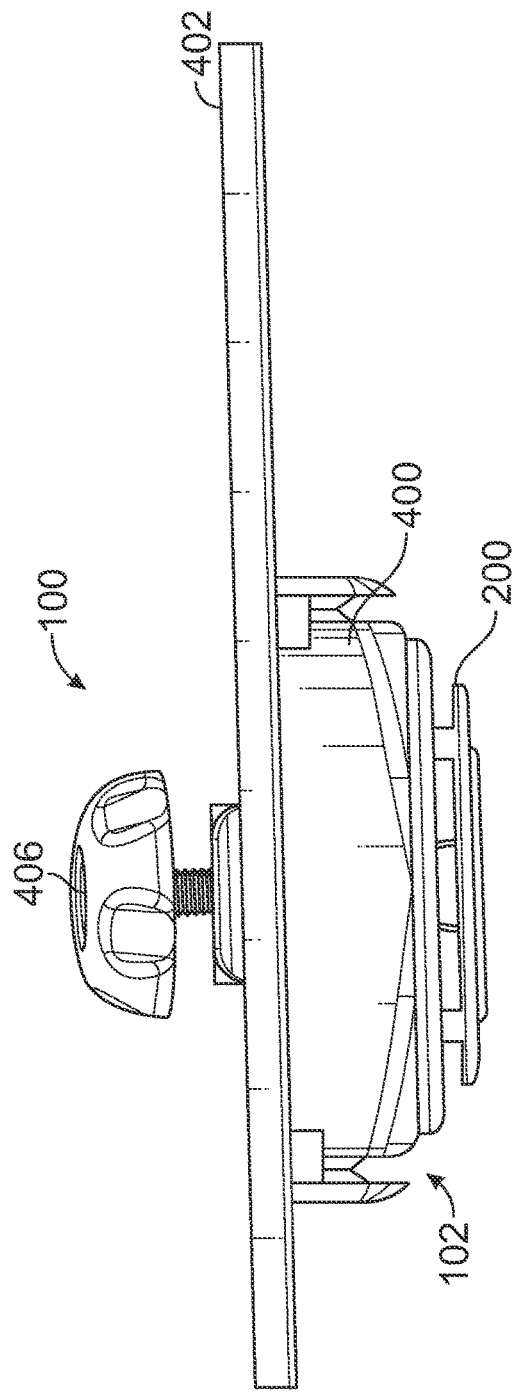
FIG. 24 illustrates a top view of the product information system of FIG. 21.
Figure 25:
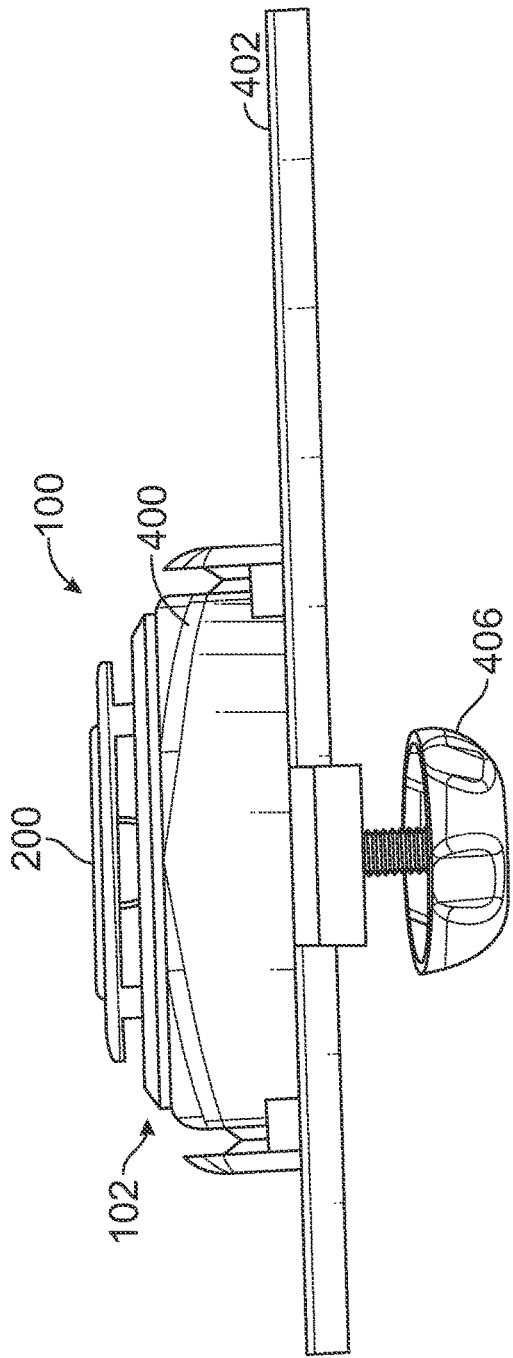
FIG. 25 illustrates a bottom view of the product information system of FIG. 21.
Figure 26:
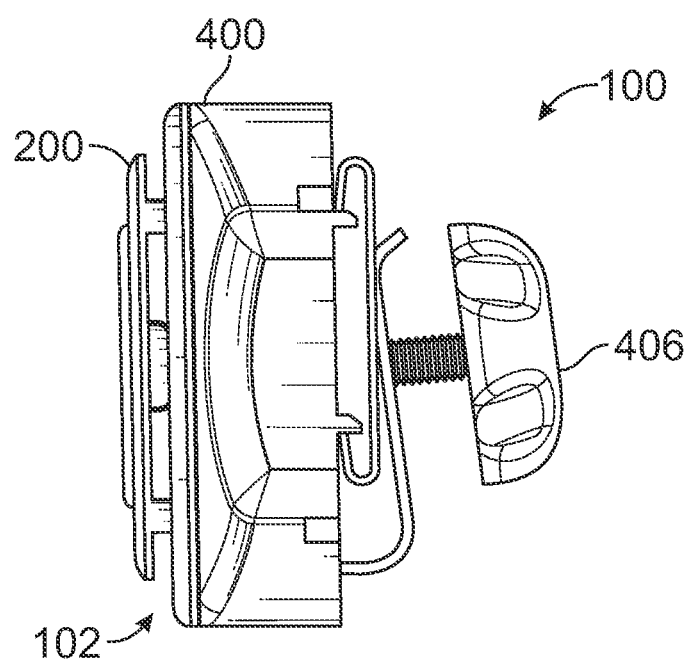
FIG. 26 illustrates a lateral view of the product information system of FIG. 21.

FIG. 21 illustrates an isometric exploded view of a product information system 100, according to an example of the present disclosure. FIG. 22 illustrates an isometric front view of the product information system 100 of FIG. 21. FIG. 23 illustrates a front view of the product information system 100 of FIG. 21. FIG. 24 illustrates a top view of the product information system 100 of FIG. 21. Figure illustrates a bottom view of the product information system 100 of FIG. 21. FIG. 26 illustrates a lateral view of the product information system 100 of FIG. 21.

Referring to FIGS. 21-26, the housing 102 can include the front ring 200 secured to a rear retainer 400 that is configured to clip to a rail 402 by a retaining clip 404 and a tap screw 406. The rail 402 can be a bracket, beam, or the like. In at least one example, the rail 402 is a price sign holder. In this example, the securing assembly 120 includes the retaining clip 404 and the tap screw 406, which are configured to secure the housing 102 to the rail 402. In this example, the product information system 100 may not include a card. Optionally, the product information system 100 may include a card.

Figure 27:
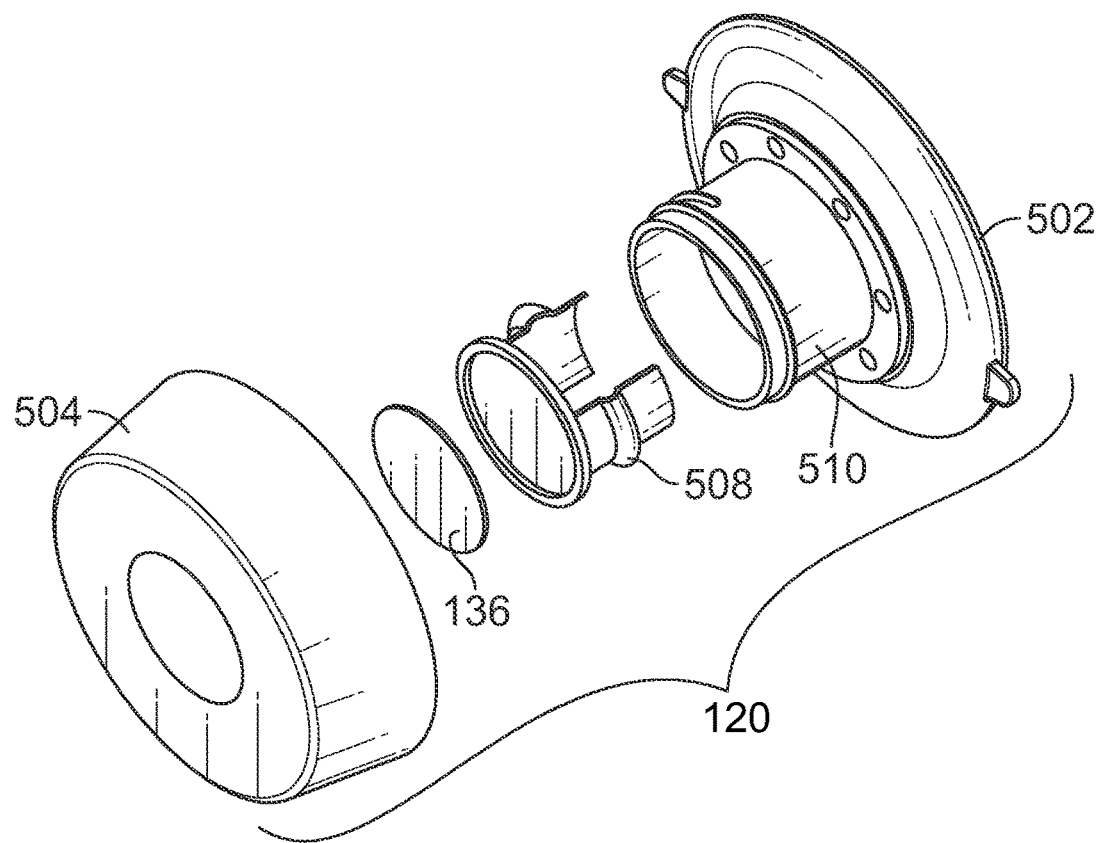
FIG. 27 illustrates an isometric exploded view of a securing assembly, according to an example of the present disclosure.
Figure 28:
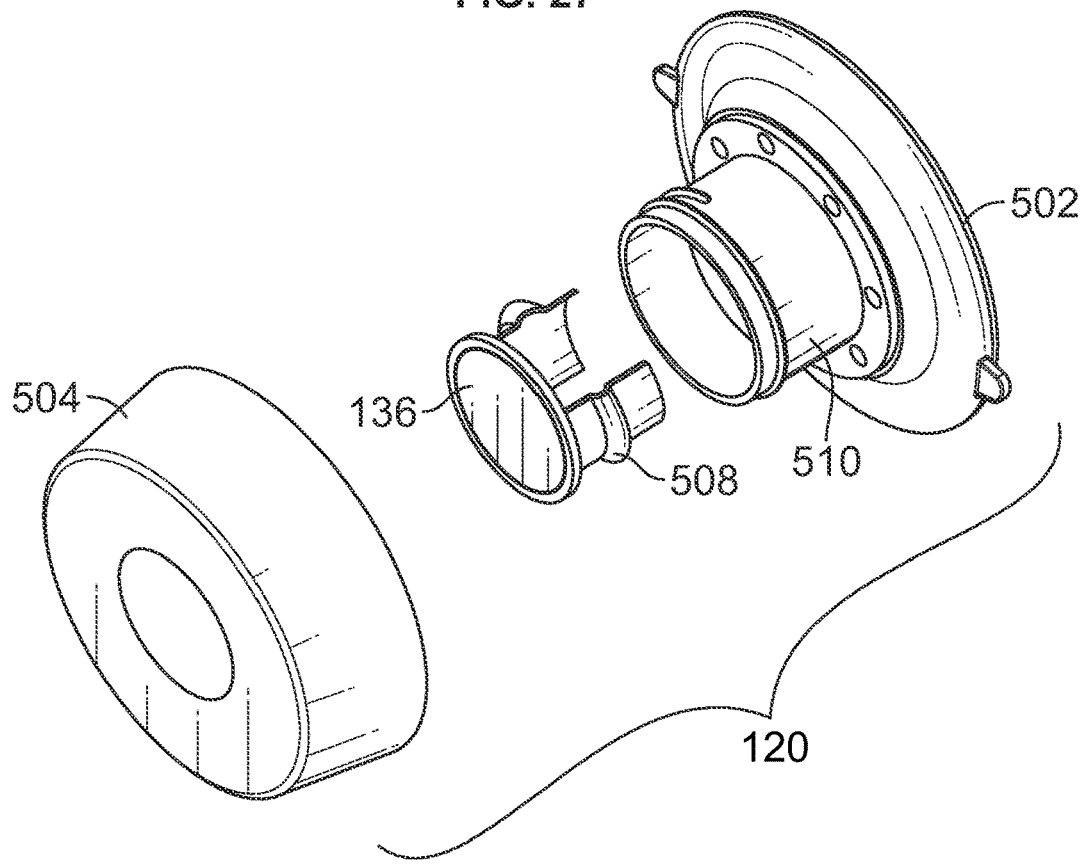
FIG. 28 illustrates an isometric view of the securing assembly having a communication device mounted on an insert mount, according to an example of the present disclosure.

FIG. 27 illustrates an isometric exploded view of a securing assembly 120, according to an example of the present disclosure. FIG. 28 illustrates an isometric view of the securing assembly 120 having a communication device 136 mounted on an insert mount 508, according to an example of the present disclosure.

The securing assembly 120 can be used with respect to any of the examples of the present disclosure. For example, the securing assembly 120 shown in FIGS. 27 and 28 can be used in place of the securing assembly 120 shown in FIGS. 1-3.

Referring to FIGS. 27 and 28, the securing assembly 120 can include a suction cup 502 that couples to a suction securing nut 504 (or knob) and/or a securing mount, which can be integrally formed with a bracket, as described in U.S. Pat. No. 10,104,986, entitled "Systems and Methods for Securing and Displaying Products." Optionally, the securing assembly 120 can include locking rings, or other such features that separately couple to the bracket. As another example, the securing assembly 120 can be configured as described in U.S. Pat. No. 10,393,168, entitled "Securing Assembly." As another example, the securing assembly 120 can include a suction cup permanently secured to a bracket. For example, a suction cup can extend from a portion of the bracket. In at least one other example, instead of a suction cup, the securing assembly 120 can include a flange or other such structure coated with a nanotechnology gel, which is similar to an adhesive, but can be removed and reused.

In at least one example, the securing assembly 120 includes the communication device 136, which can be disposed between and within one or both of the suction cup 502 and the suction securing nut 504. As noted, the communication device 136 can be a near field communication tag or chip, an RFID tag or chip, and/or the like. In at least one example, the securing assembly 120 also includes the insert mount or capsule 508 that is configured to fit within and/or around a stem 510 of the suction cup 502. In at least one example, the communication device 136 mounts on the insert mount 508.

Figure 29:
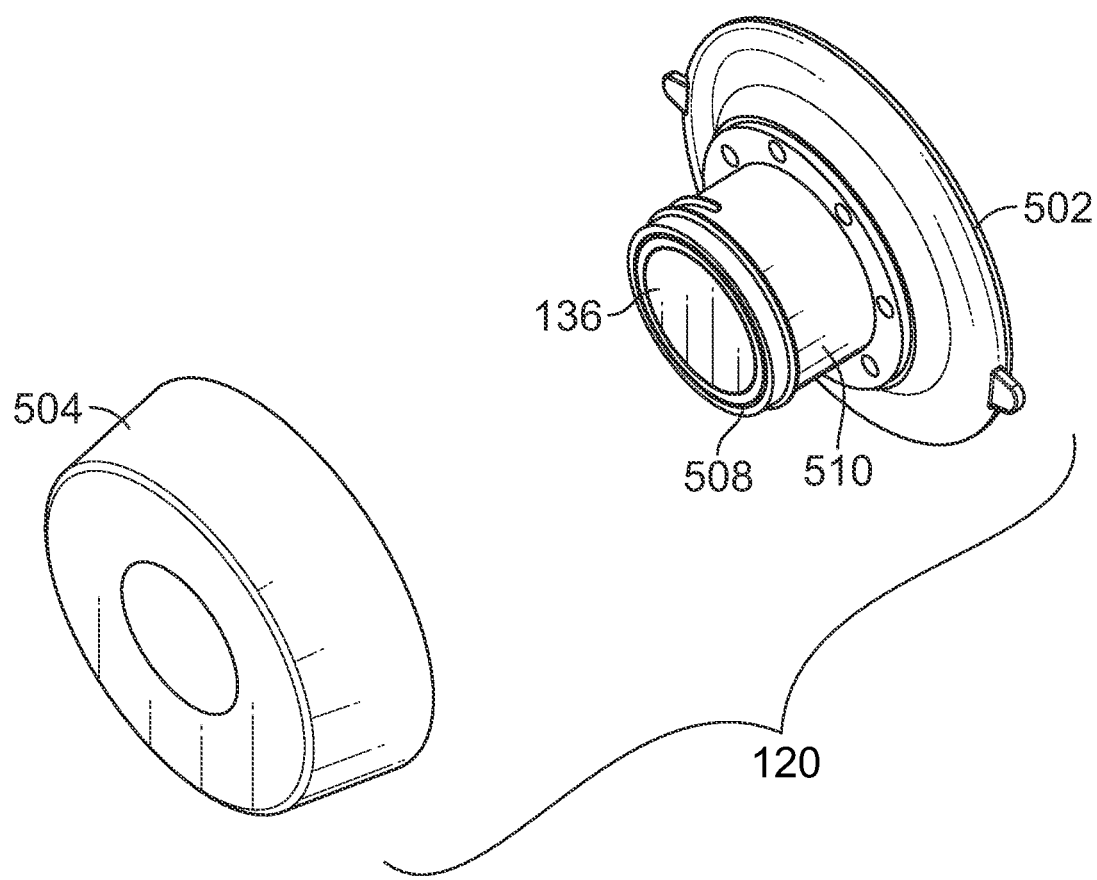
FIG. 29 illustrates an isometric view of the securing assembly having the communication device mounted on the insert mount, which is disposed within a cavity of a stem of a suction cup, according to an example of the present disclosure.
Figure 30:
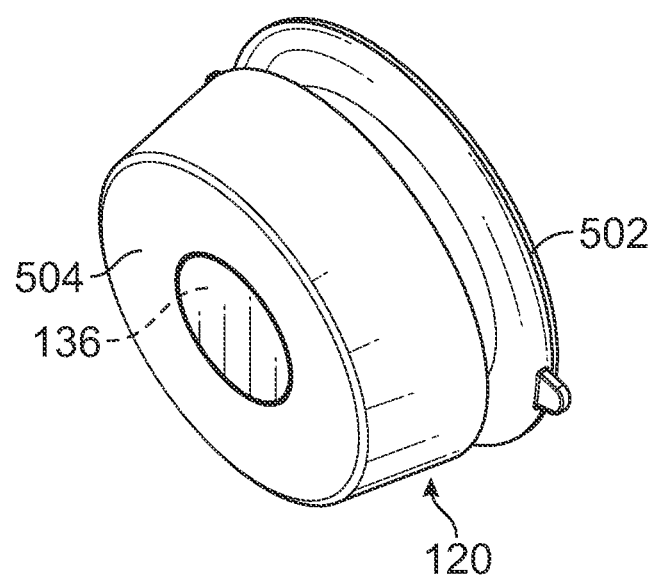
FIG. 30 illustrates an isometric view of the securing assembly, according to an example of the present disclosure.

FIG. 29 illustrates an isometric view of the securing assembly 120 having the communication device 136 mounted on the insert mount 508, which is disposed within a cavity of the stem 510 of the suction cup 502. FIG. 30 illustrates an isometric view of the securing assembly 120. As shown in FIG. 30, the suction securing nut 504 couples to the suction cup 502, such as via rotational threadable engagement. As shown in FIGS. 27-30, the communication device 136 is within the securing assembly 120 at a distal end of the stem 510 of the suction cup 502 proximate to an end of the suction securing nut 504.

Figure 31:
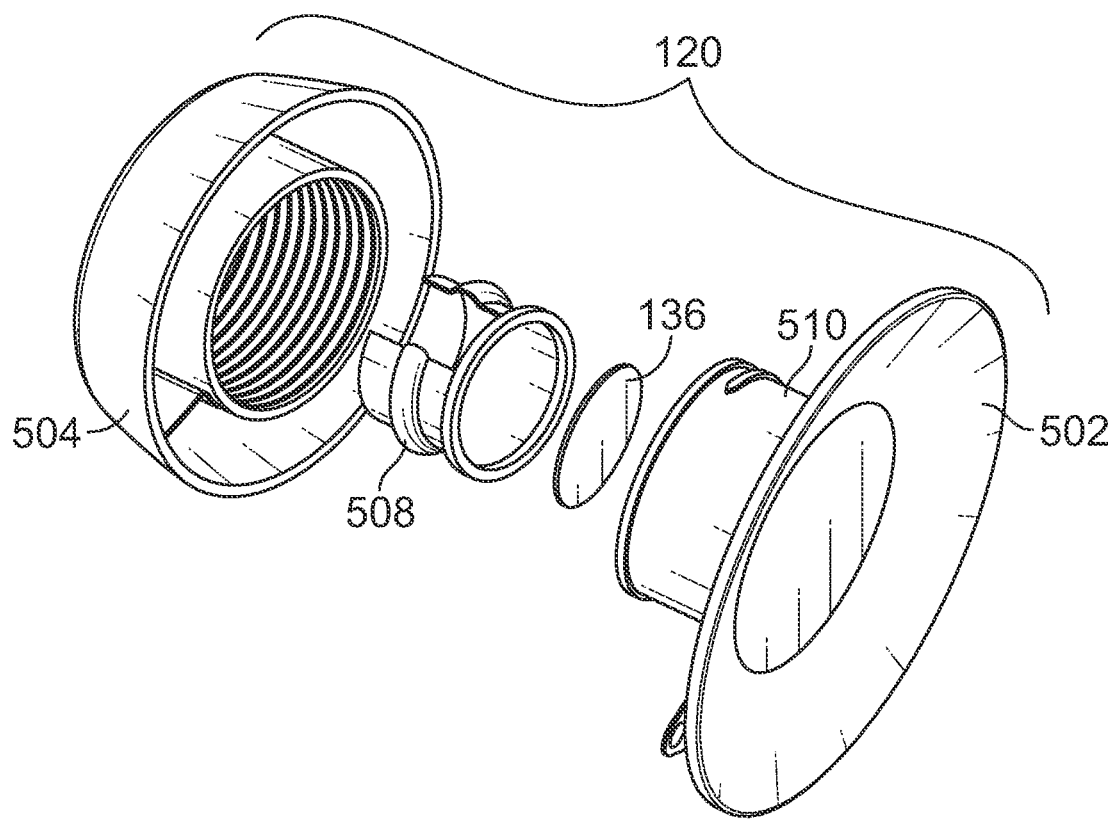
FIG. 31 illustrates an isometric exploded view of a securing assembly, according to an example of the present disclosure.
Figure 32:
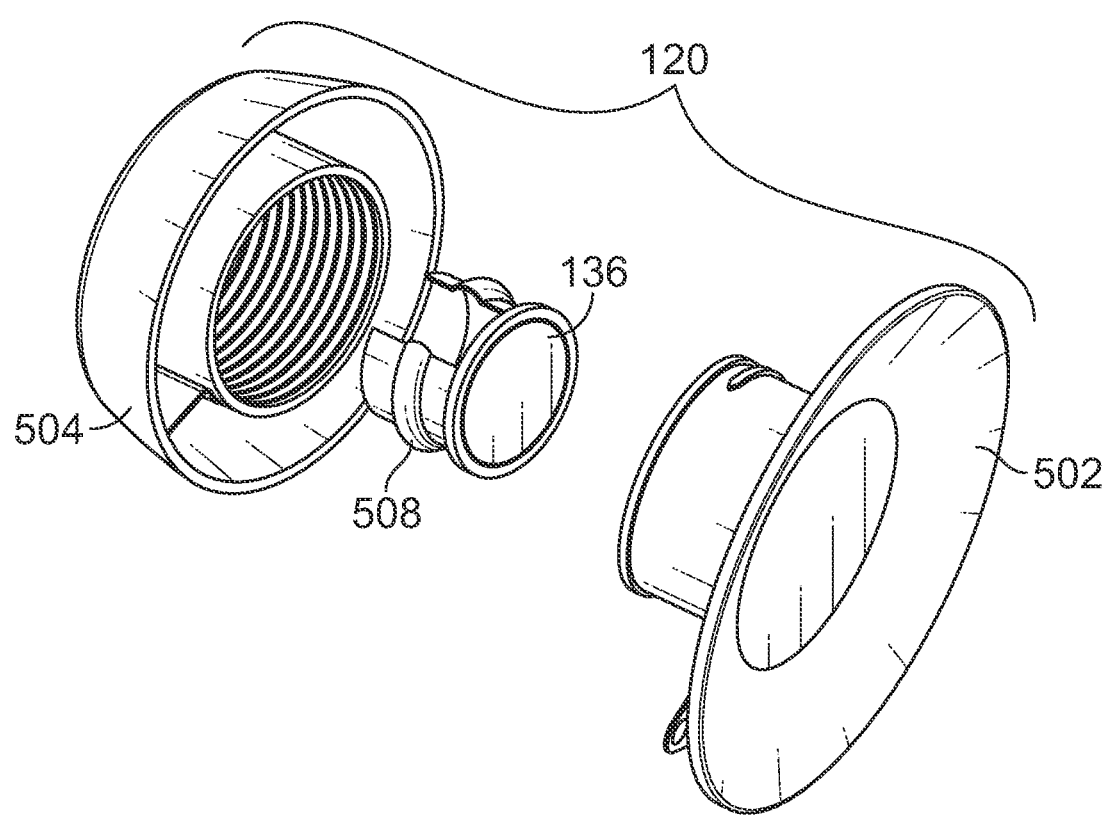
FIG. 32 illustrates an isometric view of the securing assembly having a communication device mounted on an insert mount, according to an example of the present disclosure.
Figure 33:
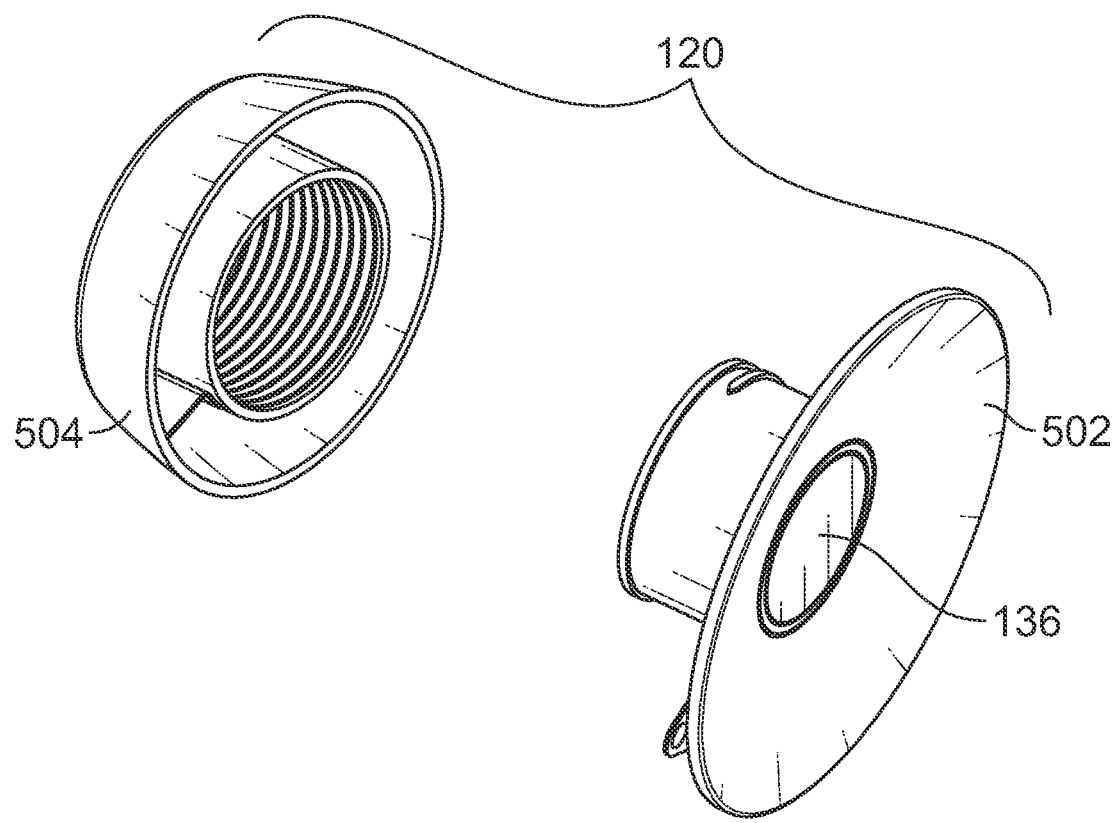
FIG. 33 illustrates an isometric view of the securing assembly having the communication device mounted on the insert mount, which is disposed within a cavity of a stem of a suction cup, according to an example of the present disclosure.
Figure 34:
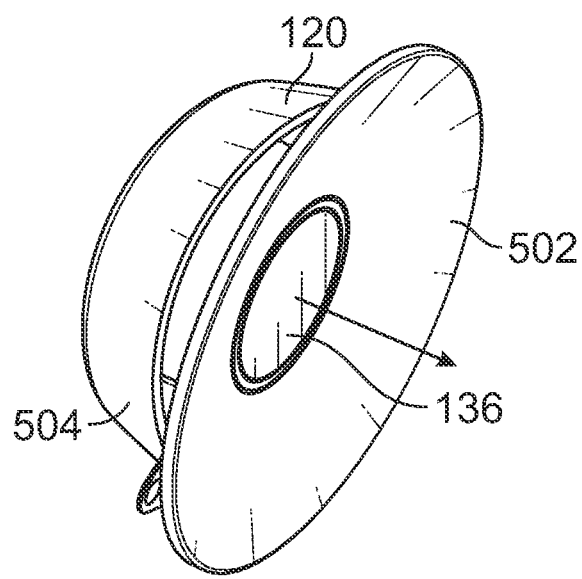
FIG. 34 illustrates an isometric view of the securing assembly, according to an example of the present disclosure.

FIG. 31 illustrates an isometric exploded view of a securing assembly 120, according to an example of the present disclosure. FIG. 32 illustrates an isometric view of the securing assembly 120 having the communication device 136 mounted on the insert mount 508. FIG. 33 illustrates an isometric view of the securing assembly 120 having the communication device 136 mounted on the insert mount 508, which is disposed within a cavity of the stem 510 of the suction cup 502. FIG. 34 illustrates an isometric view of the securing assembly 120. As shown in FIGS. 31-34, the communication device 136 can be disposed within the cavity of the stem 510 proximate to a base of the suction cup 502. The securing assembly 120 shown and described with respect to FIGS. 31-34 can be used with any of the examples of the present disclosure described herein.

Figure 35:
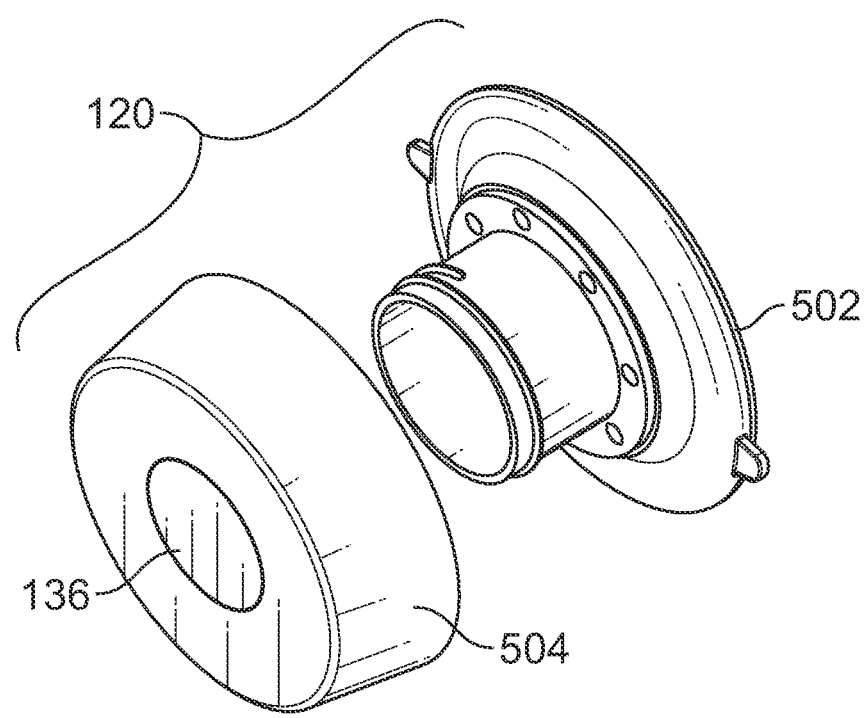
FIG. 35 illustrates an isometric view of a securing assembly having a suction cup separated from a suction securing nut, according to an example of the present disclosure.

FIG. 35 illustrates an isometric view of the securing assembly 120 having the suction cup 502 separated from the suction securing nut 504, according to an example of the present disclosure. As shown in FIG. 35, the communication device 136 can be secured to the suction securing nut 504. For example, the communication device 136 can be secured to an outer surface of the suction securing nut 504, whether directly, or indirectly through an intermediate coupling mount. Optionally, the communication device 136 can be secured to an interior surface of the suction securing nut 504. The securing assembly 120 shown and described with respect to FIG. 35 can be used with any of the examples of the present disclosure described herein.

Figure 36:
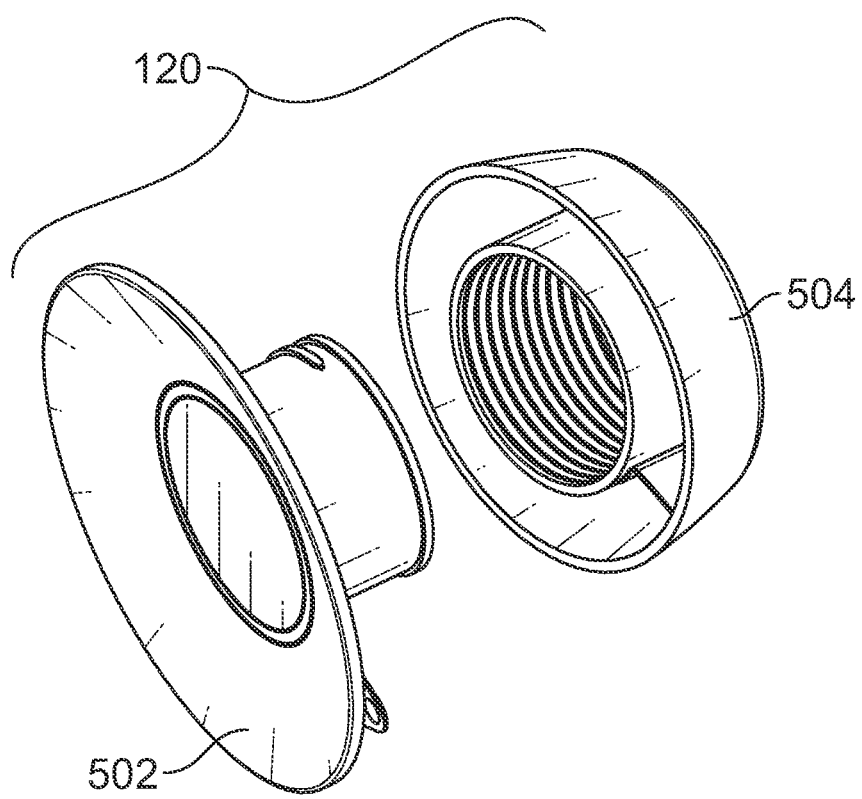
FIG. 36 illustrates an isometric view of a securing assembly having a suction cup separated from a suction securing nut, according to an example of the present disclosure.

FIG. 36 illustrates an isometric view of the securing assembly 120 having the suction cup 502 separated from the suction securing nut 504, according to an example of the present disclosure. As shown in FIG. 36, the communication device 136 can be secured to the suction cup 502. For example, the communication device 136 can be secured to an outer surface of the suction cup 502, whether directly, or indirectly through an intermediate coupling mount. Optionally, the communication device 136 can be secured to an interior surface of the suction cup 502. The securing assembly 120 shown and described with respect to FIG. 36 can be used with any of the examples of the present disclosure described herein.

Figure 37:
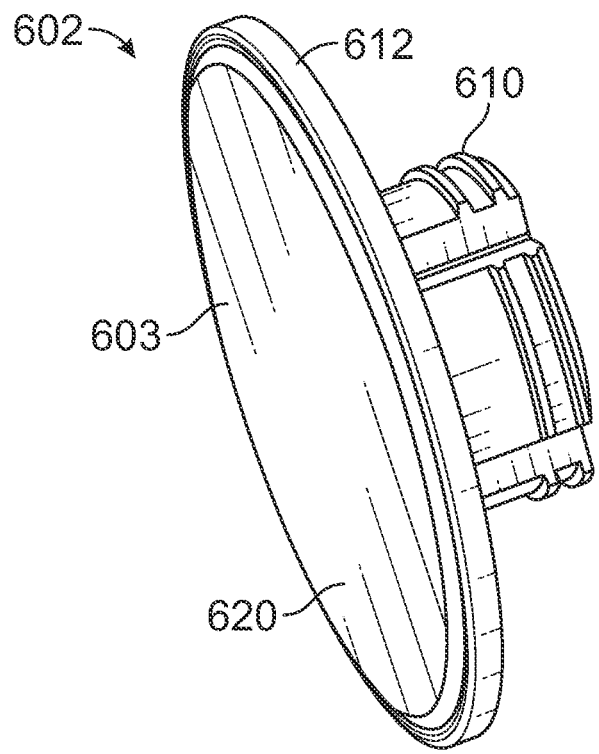
FIG. 37 illustrates an isometric rear view of a coupler, according to an example of the present disclosure.
Figure 38:
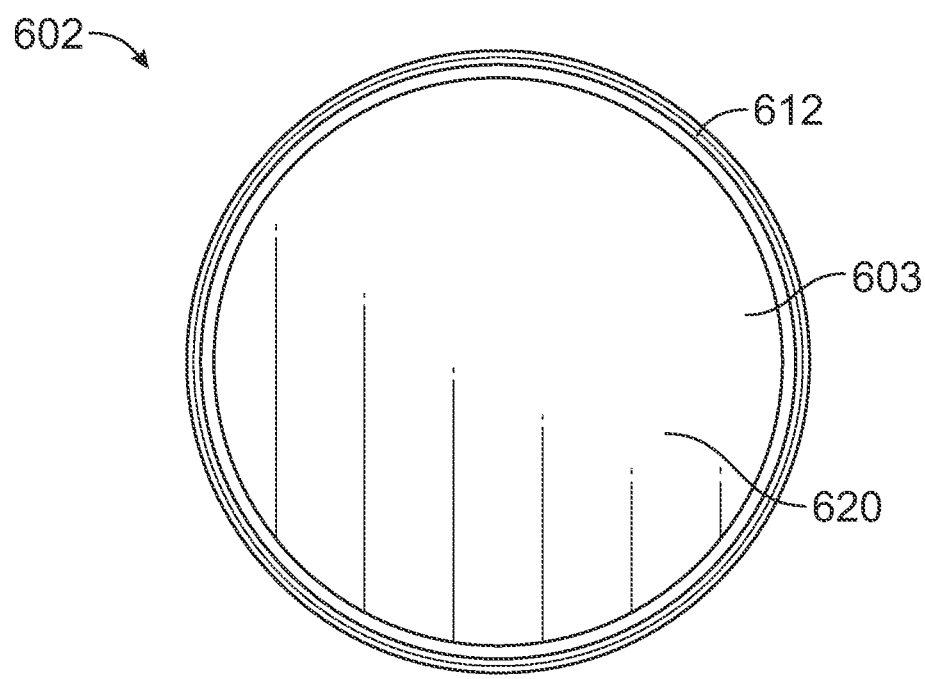
FIG. 38 illustrates a rear view of the coupler of FIG. 37.
Figure 39:
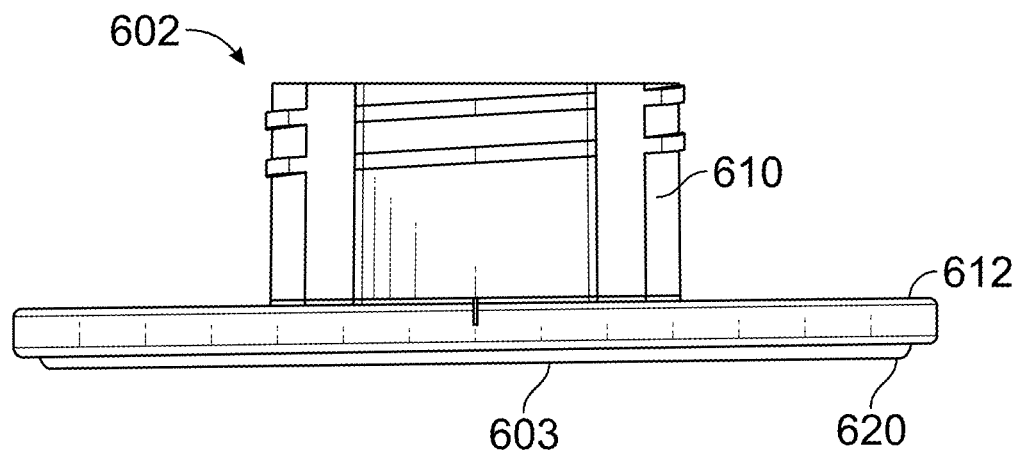
FIG. 39 illustrates a lateral view of the coupler of FIG. 37.
Figure 40:
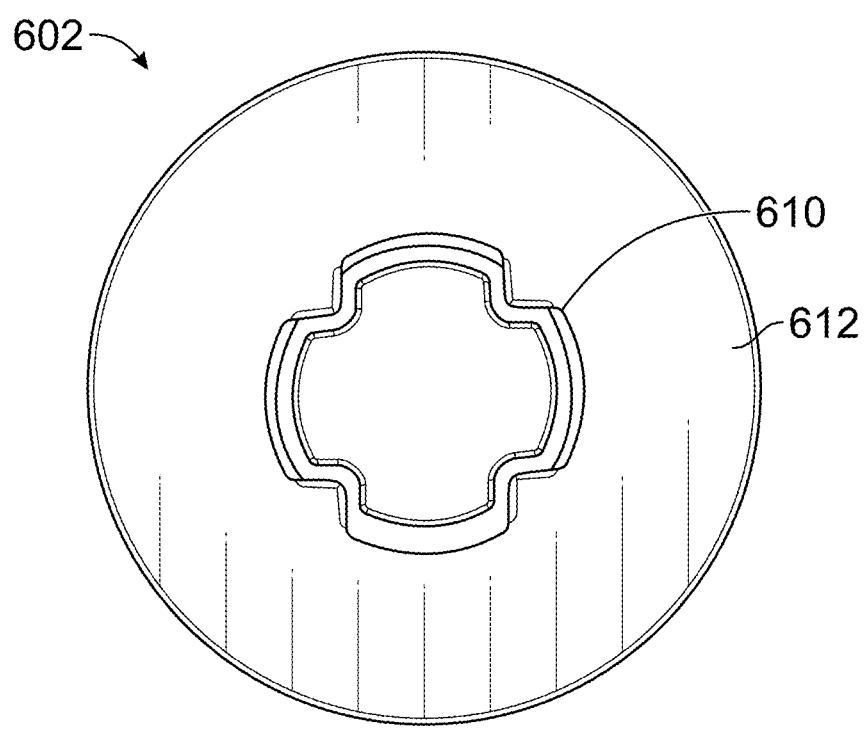
FIG. 40 illustrates a front view of the coupler of FIG. 37.

FIG. 37 illustrates an isometric rear view of a coupler 602, according to an example of the present disclosure. FIG. 38 illustrates a rear view of the coupler 602 of FIG. 37. FIG. 39 illustrates a lateral view of the coupler 602 of FIG. 37. FIG. 40 illustrates a front view of the coupler 602 of FIG. 37.

Referring to FIGS. 37-40, the coupler 602 includes a stem 610 extending from a base 612. As shown, the base 612 can be a circular disk. The stem 610 can be coaxially aligned with the base 612.

In at least one example, the coupler 602 is used with the securing assembly 120 shown and described with respect to FIGS. 27-36. In particular, in at least one example, the coupler 602 can be used in place of the suction cup 602. As noted above, instead of a suction cup, the securing assembly 120 can include a flange or other such structure coated with a nanotechnology gel 620, which is similar to an adhesive, but can be removed and reused. The coupler 602 can be used with the securing assembly 120, or various other brackets, devices, assemblies, and the like.

The coupler 602 further includes a coupling layer 603 extending from a rear surface of the base 612. The coupling layer 603 can be a film, coating, adhesive panel, and/or the like. In at least one example, the coupling layer 603 is formed of a nanotechnology gel. The coupling layer 603 can be removable from the base 612. Optionally, the coupling layer 603 can be permanently secured to the base 612. The coupling layer 603 is configured to adhere to a surface, such as a glass panel. As such, the coupler 602 is used to secure the securing assembly 120 to a structure, such as a glass door, for example.

In at least one example, the stem 610 and the base 612 can be formed of a polymer. In at least one example, the stem 610 and the base 612 can be formed of polycarbonate. In at least one example, the coupling layer 603 is formed of a polyurethane adhesive, which is configured to secure the coupler 602 to a structure. As such, the coupler 600 can be used in place of the suction cup 602 to removably secure the securing assembly 120 to a structure.

In at least one other example, the coupling layer 603 is applied to a suction cup, such as the suction cup 502. That is, a surface of the suction cup that is configured to engage a surface of a component (such as a glass door of a refrigerated or freezer compartment) includes the coupling layer 603. For example, the coupling layer 603 can coat the surface of the suction cup. As another example, the coupling layer 603 can be applied over at least a portion of the surface of the suction cup. In at least one other example, the coupling layer 603 can be applied over an entirety of the suction cup.

In at least one example, a securing assembly 120, such as any of the described herein, includes a layer of nanogel coupled to a suction cup. The securing assembly having the nanogel (such as a layer of nanogel that coats a rear surface of the suction cup) can then be mounted on a surface of a component, such as a glass panel of a door of a freezer or a refrigerated compartment. The surface of the component can first be cleaned with an alcohol wipe, for example. It has been found that the nanogel layer combats condensation that can form on freezer doors (a suction cup without such nanogel layer is less likely to combat such condensation).

Further, the disclosure comprises examples according to the following clauses:

Clause 1. A product information system comprising:
a housing; and
a communication device coupled to the housing, wherein the communication device is configured to provide information regarding one or more products in response to being engaged by a device of an individual.

Clause 2. The product information system of Clause 1, wherein the housing comprises a rear panel secured to a front panel.

Clause 3. The product information system of Clauses 1 or 2, wherein the housing comprises a clip that removably retains a card, wherein the card retains the communication device.

Clause 4. The product information system of Clause 3, wherein the clip comprises a tap indicia, wherein the tap indicia provides an area where the individual can tap the device to engage the communication device.

Clause 5. The product information system of Clauses 3 or 4, wherein the card comprises a plurality of defined slots configured to receive and retain reciprocal protrusions of the clip.

Clause 6. The product information system of any of Clauses 3-5, wherein the card comprises one or both of a graphics or text regarding the one or more products.

Clause 7. The product information system of any of Clauses 3-6, wherein the communication device is secured within folded portions of the card.

Clause 8. The product information system of any of Clauses 1-7, further comprising a securing assembly coupled to the housing.

Clause 9. The product information system of Clause 8, wherein the securing assembly comprises a moveable joint that moveably couples the housing to a mount.

Clause 10. The product information system of Clause 9, wherein the moveable joint is a ball and socket joint.

Clause 11. The product information system of any of Clauses 8-10, wherein the securing assembly comprises a flexible layer of nanotechnology gel.

Clause 12. The product information system of any of Clauses 8-11, wherein the securing assembly comprises a suction cup assembly.

Clause 13. The product information system of Clause 12, wherein the suction cup assembly comprises a flexible layer of nanotechnology gel.

Clause 14. The product information system of any of Clauses 8-13, wherein the securing assembly comprises a stand.

Clause 15. The product information system of any of Clauses 8-14, wherein the communication device is secured to the securing assembly.

Clause 16. The product information system of any of Clauses 8-15, wherein the securing assembly comprises a suction cup and a suction securing nut.

Clause 17. The product information system of Clause 16, wherein the communication device is disposed between and within one or both of the suction cup and the suction securing nut.

Clause 18. The product information system of Clauses 16 or 17, wherein the securing assembly further comprises an insert mount that fits within or around a stem of the suction cup, and wherein the communication device is mounted on the insert mount.

Clause 19. The product information system of any of Clauses 16-18, wherein the communication device is secured to the suction cup.

Clause 20. The product information system of Clause 16, wherein the communication device is secured to the suction securing nut.

Clause 21. The product information system of any of Clauses 1-20, wherein the communication device comprises a near field communication chip.

Clause 22. The product information system of any of Clauses 1-21, wherein the housing comprises a front ring removably secured to a rear ring, wherein a central passage is formed through the ring, and wherein the communication device is aligned with the central passage.

Clause 23. The product information system of any of Clauses 1-22, wherein the housing comprises a front ring secured to a rear retainer, and wherein the rear retainer secures to a rail by a retaining clip and a tap screw.

Clause 24. A product information method comprising:
coupling a communication device to a housing; and
providing, by the communication device, information regarding one or more products in response to the communication device being engaged by a device of an individual.

Clause 25. A product information system comprising:
a housing including a clip having a tap indicia; and
a card having a communication device, wherein the clip removably retains the card, wherein the communication device is secured within folded portions of the card, wherein the card comprises a plurality of defined slots configured to receive and retain reciprocal protrusions of the clip, wherein the communication device is configured to provide information regarding one or more products in response to being engaged by a device of an individual, and wherein the tap indicia provides an area where the individual can tap the device to engage the communication device.

Clause 26. The product information system of Clause 25, further comprising a securing assembly coupled to the housing.

Clause 27. The product information system of Clause 26, wherein the securing assembly comprises a flexible layer of nanotechnology gel.

Clause 28. The product information system of Clauses 26 or 27, wherein the securing assembly comprises a suction cup assembly.

Clause 29. The product information system of Clause 28, wherein the suction cup assembly comprises a flexible layer of nanotechnology gel.

Clause 30. The product information system of any of Clauses 25-29, wherein the securing assembly comprises a stand.

As described herein, examples of the present disclosure provide product information systems and methods, such as can be used with a product holder system, that is configured to allow an individual to quickly, and easily determine information regarding a product, service, and/or the like.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A product information system comprising:
a card;
a communication device retained by the card; and
a housing comprising a clip that removably retains the card that retains the communication device
wherein the communication device is configured to provide information regarding one or more products in response to being engaged by a device of an individual.

2. The product information system of claim 1, wherein the housing comprises a rear panel secured to a front panel.

3. The product information system of claim 1, wherein the clip comprises a tap indicia, wherein the tap indicia provides an area where the individual can tap the device to engage the communication device.

4. The product information system of claim 1, wherein the card comprises a plurality of defined slots configured to receive and retain reciprocal protrusions of the clip.

5. The product information system of claim 1, wherein the card comprises one or both of a graphics or text regarding the one or more products.

6. The product information system of claim 1, wherein the communication device is secured within folded portions of the card.

7. The product information system of claim 6, wherein the card comprises:
a base sheet having first slots; and
a retainer sheet extending upwardly from the base sheet, wherein the retainer sheet has second slots,
wherein the retainer sheet is folded over the base sheet,
wherein the communication device is sandwiched between the retainer sheet and the base sheet,
wherein the first slots are aligned with the second slots when the retainer sheet is folded over the base sheet, and
wherein the first slots aligned with the second slots retain protrusions of the clip.

8. The product information system of claim 1, further comprising a securing assembly coupled to the housing.

9. The product information system of claim 8, wherein the securing assembly comprises a moveable joint that moveably couples the housing to a mount.

10. The product information system of claim 9, wherein the moveable joint is a ball and socket joint.

11. The product information system of claim 8, wherein the securing assembly comprises a flexible layer of nanotechnology gel.

12. The product information system of claim 8, wherein the securing assembly comprises a suction cup assembly.

13. The product information system of claim 12, wherein the suction cup assembly comprises a flexible layer of nanotechnology gel.

14. The product information system of claim 8, wherein the securing assembly comprises a stand.

15. The product information system of claim 8, wherein the communication device is secured to the securing assembly.

16. The product information system of claim 8, wherein the securing assembly comprises a suction cup and a suction securing nut.

17. The product information system of claim 16, wherein the communication device is disposed between and within one or both of the suction cup and the suction securing nut.

18. The product information system of claim 16, wherein the securing assembly further comprises an insert mount that fits within or around a stem of the suction cup, and wherein the communication device is mounted on the insert mount.

19. The product information system of claim 16, wherein the communication device is secured to the suction cup.

20. The product information system of claim 16, wherein the communication device is secured to the suction securing nut.

21. The product information system of claim 1, wherein the communication device comprises a near field communication chip.

22. The product information system of claim 1, wherein the housing comprises a front ring removably secured to a rear ring, wherein a central passage is formed through the ring, and wherein the communication device is aligned with the central passage.

23. The product information system of claim 1, wherein the housing comprises a front ring secured to a rear retainer, and wherein the rear retainer secures to a rail by a retaining clip and a tap screw.

24. A product information method comprising:
retaining a communication device by a card;
removably retaining the card that retains the communication device by a clip of a housing; and
providing, by the communication device, information regarding one or more products in response to the communication device being engaged by a device of an individual.

25. A product information system comprising:
a housing including a clip having a tap indicia; and
a card having a communication device, wherein the clip removably retains the card, wherein the communication device is secured within folded portions of the card, wherein the card comprises a plurality of defined slots configured to receive and retain reciprocal protrusions of the clip,
wherein the communication device is configured to provide information regarding one or more products in response to being engaged by a device of an individual, and
wherein the tap indicia provides an area where the individual can tap the device to engage the communication device.

26. The product information system of claim 25, further comprising a securing assembly coupled to the housing.

27. The product information system of claim 26, wherein the securing assembly comprises a flexible layer of nanotechnology gel.

28. The product information system of claim 26, wherein the securing assembly comprises a suction cup assembly.

29. The product information system of claim 28, wherein the suction cup assembly comprises a flexible layer of nanotechnology gel.

30. The product information system of claim 26, wherein the securing assembly comprises a stand.

* * * * *